United States Patent
Yamaguchi et al.

(10) Patent No.: US 8,320,607 B2
(45) Date of Patent: Nov. 27, 2012

(54) IMAGE PROCESSING METHOD AND IMAGE PROCESSING DEVICE FOR EMBEDDING INVISIBLE SUB INFORMATION INTO MAIN IMAGES

(75) Inventors: Takashi Yamaguchi, Kawasaki (JP); Takeo Miki, Machida (JP); Kenji Miyazaki, Komae (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 942 days.

(21) Appl. No.: 12/237,116

(22) Filed: Sep. 24, 2008

(65) Prior Publication Data
US 2009/0087020 A1 Apr. 2, 2009

(30) Foreign Application Priority Data

Sep. 27, 2007 (JP) ................................. 2007-251758

(51) Int. Cl.
G06K 9/00 (2006.01)
(52) U.S. Cl. ...................................................... 382/100
(58) Field of Classification Search .................. 382/100, 382/232–253; 380/200–242; 358/426.01–426.16; 354/555; 348/384.1–440.1; 375/122, 240.01–240.29
See application file for complete search history.

(56) References Cited

U.S. PATENT DOCUMENTS

| 2001/0040980 | A1 | 11/2001 | Yamaguchi et al. |
| 2002/0181025 | A1 | 12/2002 | Yamaguchi et al. |
| 2004/0121131 | A1 | 6/2004 | Yamaguchi et al. |
| 2004/0181671 | A1 | 9/2004 | Brundage et al. |
| 2004/0215965 | A1 | 10/2004 | Tokuda et al. |
| 2005/0116029 | A1 | 6/2005 | Miki et al. |
| 2005/0134622 | A1 | 6/2005 | Yamaguchi et al. |
| 2006/0023260 | A1 | 2/2006 | Miki et al. |
| 2006/0165257 | A1 | 7/2006 | Yamaguchi et al. |
| 2006/0286489 | A1 | 12/2006 | Duffield et al. |
| 2007/0052990 | A1 | 3/2007 | Miki et al. |
| 2007/0223780 | A1 | 9/2007 | Yamaguchi et al. |
| 2007/0279515 | A1 | 12/2007 | Miyazaki et al. |
| 2009/0002736 | A1 | 1/2009 | Miki et al. |
| 2009/0087020 | A1 | 4/2009 | Yamaguchi et al. |
| 2009/0092280 | A1 | 4/2009 | Yamaguchi et al. |

FOREIGN PATENT DOCUMENTS
EP 0921 675 A2 6/1999
(Continued)

OTHER PUBLICATIONS

European Search Report dated Dec. 4, 2008 for Appln. No. 08016857.8-2218.

(Continued)

*Primary Examiner* — Atiba O Fitzpatrick
(74) *Attorney, Agent, or Firm* — Pillsbury Winthrop Shaw Pittman, LLP

(57) ABSTRACT

An electronic watermarking embedding-processing section acquires layout information which specifies an embedding area of first sub information and an embedding area of second sub information in main image information. The electronic watermarking embedding-processing section performs overlapping processing for invisibly embedding the first sub information in the embedding area of the first sub information in the main image information which is specified by the layout information. The electronic watermarking embedding-processing section performs overlapping processing for invisibly embedding the second sub information in the embedding area of the second sub information in the main image information which is specified by the layout information. The electronic watermarking embedding-processing section creates composite image information by composing image information in which the first sub information is invisibly embedded in the main image information and image information in which the second sub information is invisibly embedded in the main image information.

20 Claims, 19 Drawing Sheets

FOREIGN PATENT DOCUMENTS

| | | |
|---|---|---|
| EP | 1385121 A1 | 1/2004 |
| EP | 1471722 A2 | 10/2004 |
| EP | 1833237 A2 | 9/2007 |
| JP | 11-168616 | 6/1999 |
| JP | 3547892 | 4/2004 |
| JP | 2005-184603 | 7/2005 |

OTHER PUBLICATIONS

Korean Office Action dated Jan. 29, 2010 for Appln. No. 10-2008-94147.

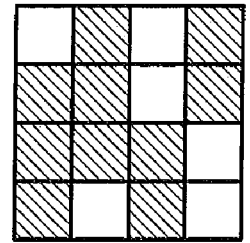
FIG. 8E  1110011111000011
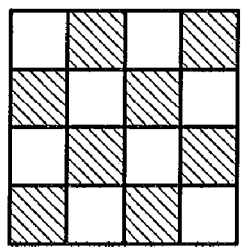
FIG. 8C  1010010110100101
FIG. 8A  0011110000111100
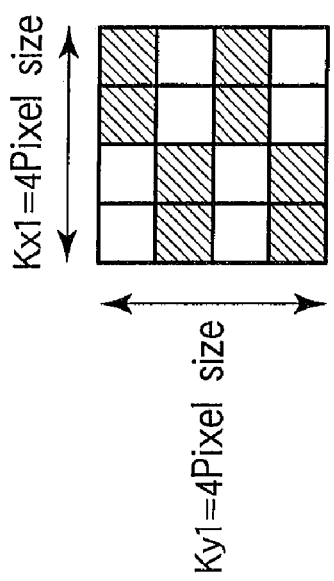

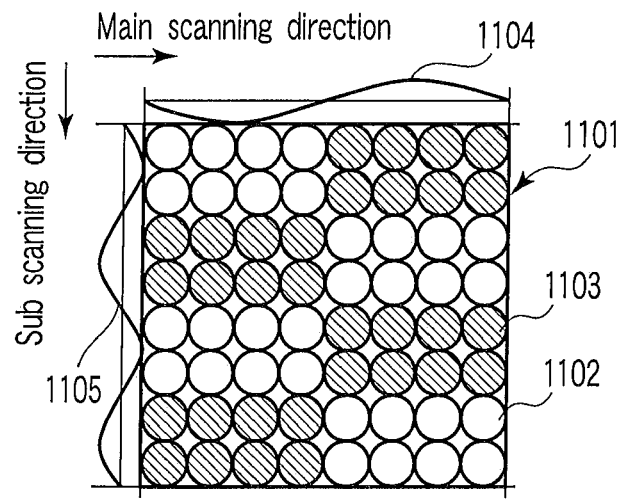
F I G. 11
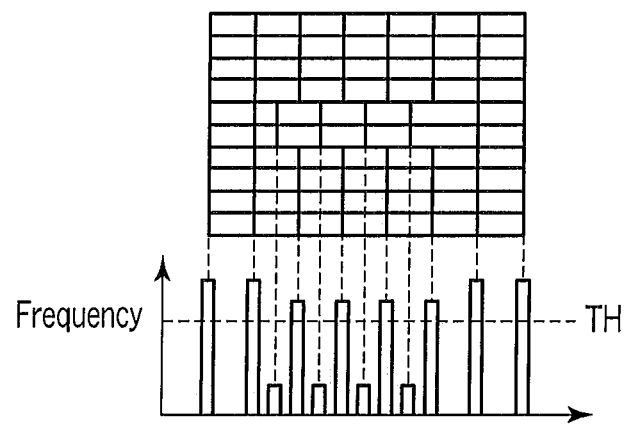
F I G. 12
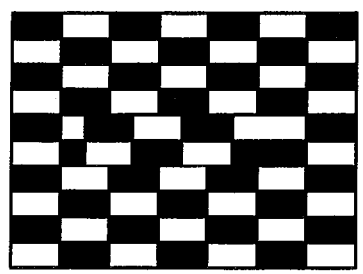
F I G. 13

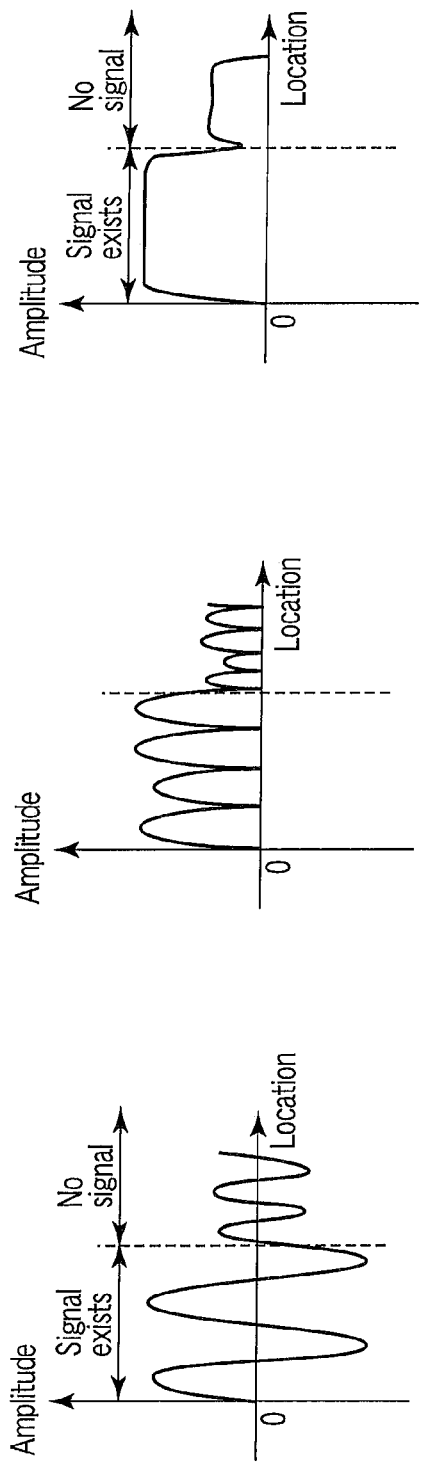
FIG. 14C
FIG. 14B
FIG. 14A
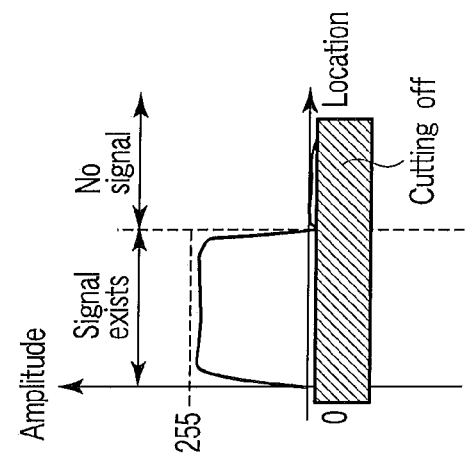
FIG. 15B
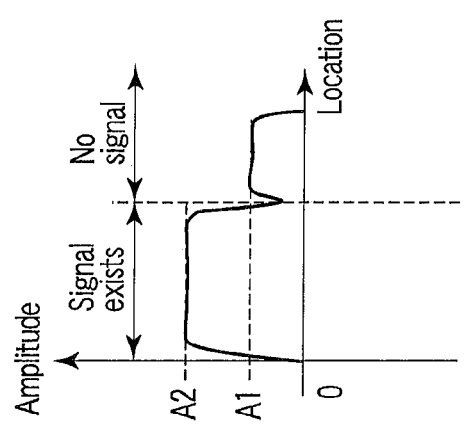
FIG. 15A

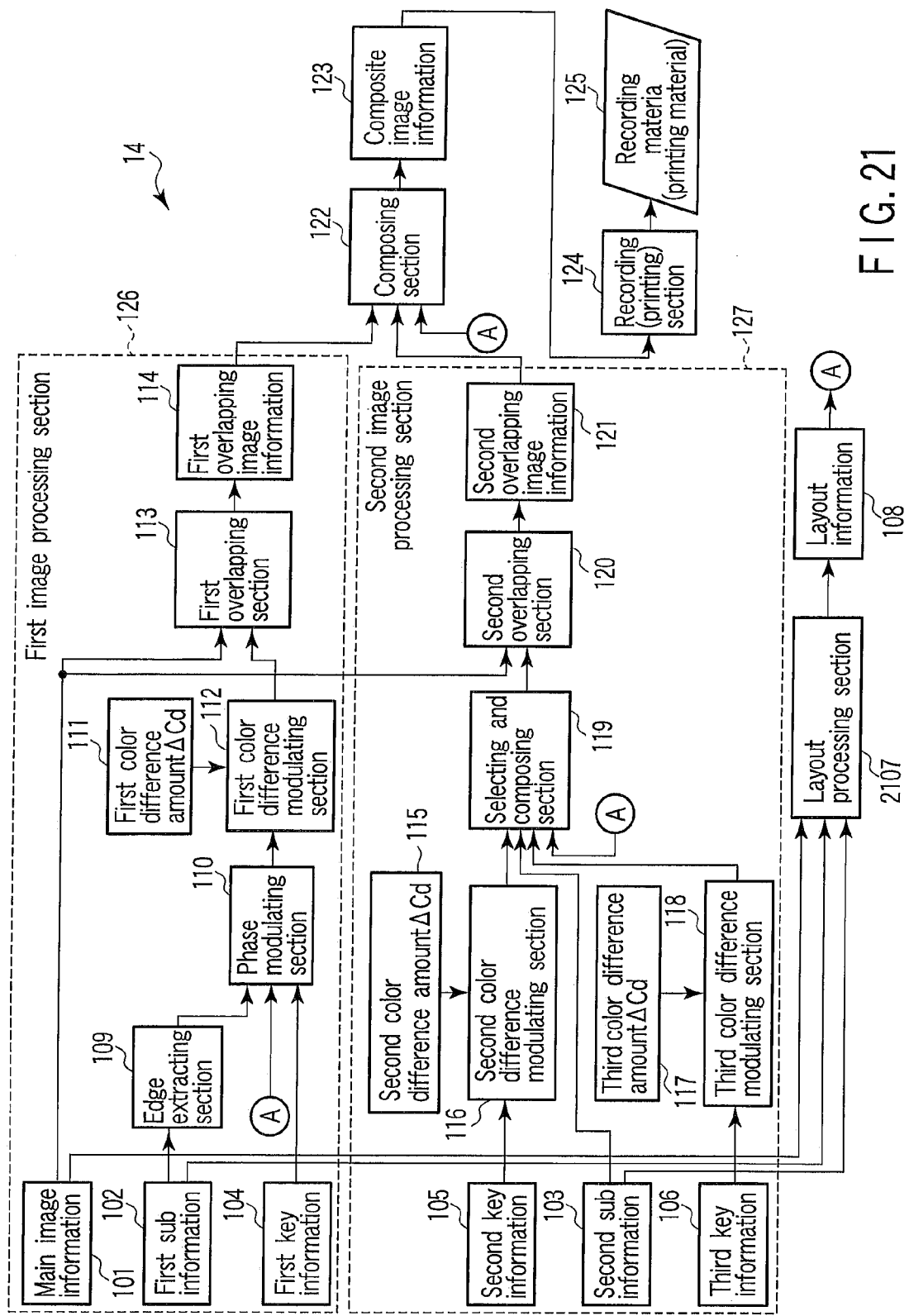
F I G. 21

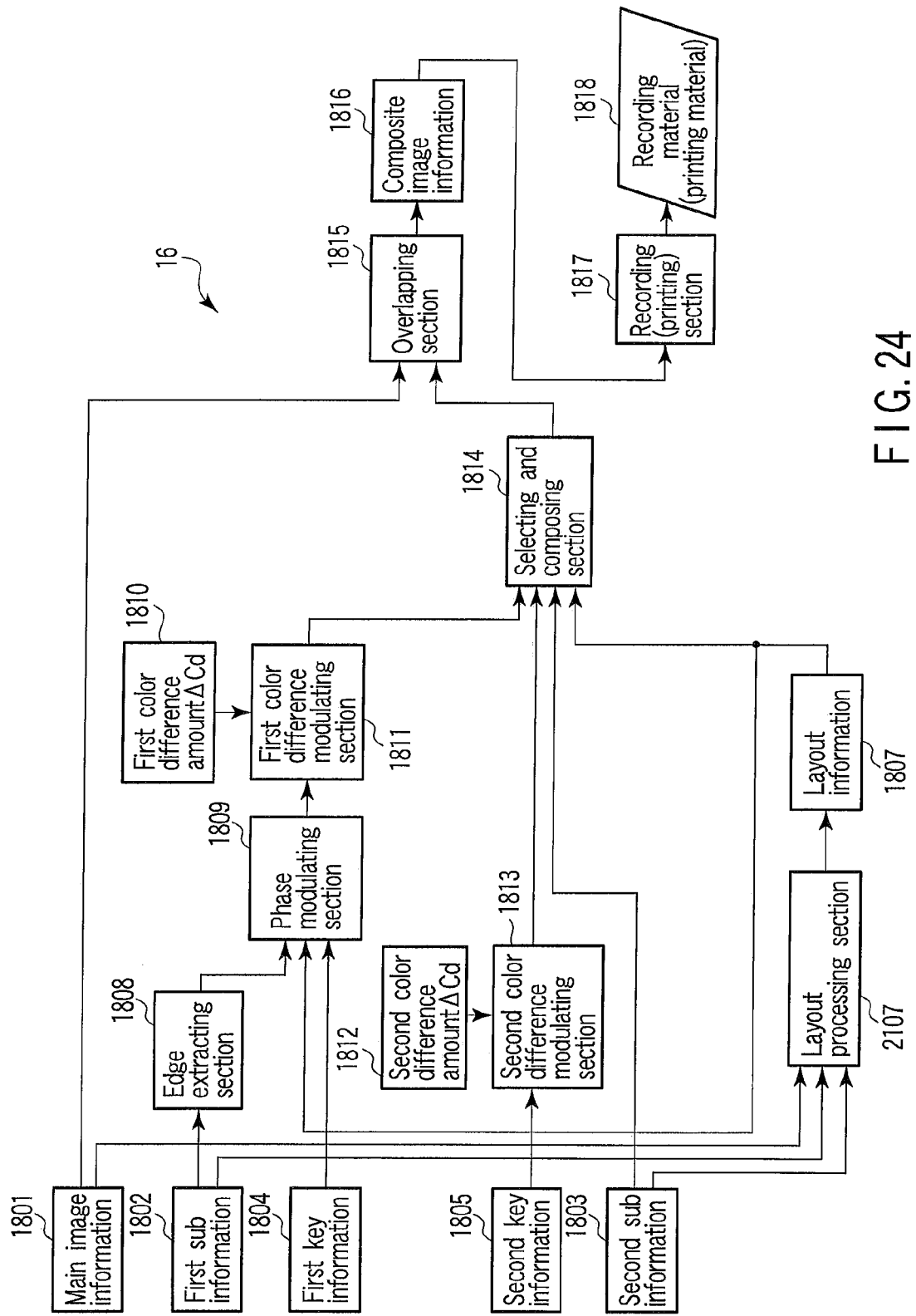
F I G. 24

IMAGE PROCESSING METHOD AND IMAGE PROCESSING DEVICE FOR EMBEDDING INVISIBLE SUB INFORMATION INTO MAIN IMAGES

CROSS-REFERENCE TO RELATED APPLICATIONS

This application is based upon and claims the benefit of priority from prior Japanese Patent Application No. 2007-251758, filed Sep. 27, 2007, the entire contents of which are incorporated herein by reference.

BACKGROUND OF THE INVENTION

1. Field of the Invention

The present invention relates to an image processing method and an image processing device for creating composite image information in which sub information (e.g., security information) is invisibly embedded in main image information like a human facial image or reconstructing the sub information from the composite image information.

2. Description of the Related Art

Recently, with a trend toward electronization of information and proliferation of the Internet, technologies such as electronic watermarking or electronic signature are attracting public attention to prevent counterfeiting and alteration of images. Particularly, an electronic watermarking technique for embedding additional sub information (e.g., security information) in main image information (e.g., human facial image) has been used as a countermeasure against unauthorized copying, counterfeiting, and tampering of an ID card or a photograph with copy right information embedded therein.

For example, Japanese Patent No. 3547892 (Document 1) discloses an electronic watermarking inserting technique for embedding data as sub information into image data as main image information which is to be printed on a recording medium by using characteristics of a high spatial frequency component and a color difference component which a human being is difficult to recognize.

However, in the above-mentioned Document 1, only contour information of sub information is principally embedded into main image information. Therefore, information reconstructed as sub information is only contour information. That is, information other than contour information, such as density information is not reconstructed by the electronic watermarking technique disclosed in Document 1. For this reason, the electronic watermarking technique disclosed in Document 1 is not suitable for a type for reconstructing two-dimensional image information like a two-dimensional code as sub information.

Jpn. Pat. Appln. KOKAI Publication No. 2005-184603 (Document 2) discloses an electronic watermarking technique in which a two-dimensional code which is two-dimensional image information is used as sub information. However, information represented by a two-dimensional code is not information which can be understood directly by a human being. That is, it is difficult for a human being to directly discriminate whether image information of a reconstructed two-dimensional code is proper or not.

BRIEF SUMMARY OF THE INVENTION

It is an object of the present invention to provide an image processing method and an image processing device which perform electronic watermarking embedding-processing or electronic watermarking reconstruction processing in which a reconstruction result of high convenience is efficiently obtained.

According to one embodiment of the present invention, there is provided an image processing method for embedding sub information of an invisible state into main image information of a visible state, comprising: acquiring layout information which specifies an embedding location of first sub information and an embedding location of second sub information in the main image information; and performing image processing for invisibly embedding the first sub information at the embedding location of the first sub information in the main image information specified by the layout information and invisibly embedding the second sub information at the embedding location of the second sub information in the main image information specified by the layout information.

According to one embodiment of the present invention, there is provided an image processing device for embedding sub information of an invisible state into main image information of a visible state, comprising: an image processing section which embeds first sub information in an embedding area of the first sub information in the main image information and embeds second sub information in an embedding area of the second sub information in the main image information, the embedding area of the first sub information and the embedding area of the second sub information being specified by layout information representing the embedding area of the first sub information and the embedding area of the second sub information in the main image information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8A is a view illustrating an example of first key information expressed by a binary number;

FIG. 8B shows an example of the first key information (first key image information) which is two-value image information;

FIG. 8C is a view illustrating an example of second key information expressed by a binary number;

FIG. 8D shows an example of the second key information (second key image information) which is two-value image information;

FIG. 8E is a view illustrating an example of third key information expressed by a binary number;

FIG. 8F shows an example of the third key information (third key image information) which is two-value image information;

FIG. 11 is a view illustrating an example of an image area composed of 8×8 pixels in key image information;

FIG. 12 is a view illustrating a processing operation of a zero cross point extracting section;

FIG. 13 is a view illustrating a processing operation of a deviation amount processing section;

FIG. 14A is a view illustrating an example of a signal extracted by a second frequency component extracting section;

FIG. 14B is a view illustrating an example of a wave transformed from a wave of FIG. 14A;

FIG. 14C is a view illustrating an example of a wave transformed from a wave of FIG. 14A;

FIG. 15A is a view illustrating a wave obtained as a processing result of a smoothing processing section;

FIG. 15B is a view illustrating an example of a result (wave) that coordinate conversion is performed as normalization processing for the wave of FIG. 15A;

FIG. 21 is a view illustrating schematically an electronic watermarking embedding-processing section as an image processing device according to a third embodiment of the present invention;

FIG. 24 schematically shows a configuration example of an electronic watermarking embedding-processing section of an image processing device according to a fourth embodiment of the present invention.

DETAILED DESCRIPTION OF THE INVENTION

Hereinafter, embodiments of the present invention will be described with reference to the attached drawings.

First, a first embodiment of the present invention will be described.

Figure 1:
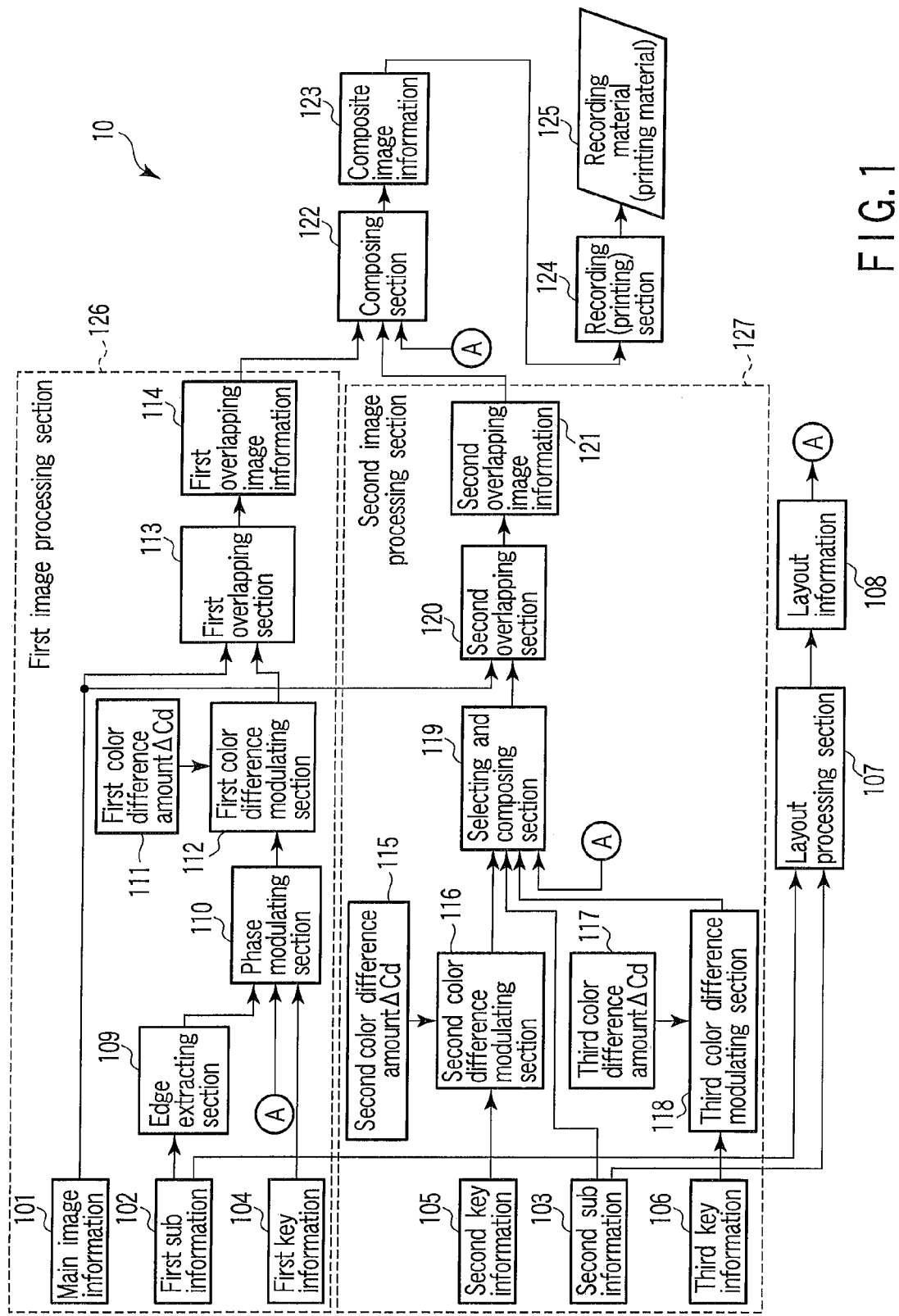
FIG. 1 is a schematic diagram illustrating a configuration example of an electronic watermarking embedding-processing section according to the first embodiment of the present invention.

FIG. 1 is a schematic diagram illustrating a configuration example of an electronic watermarking embedding-processing section 10 of an image processing device according to the first embodiment of the present invention. Here, electronic watermarking embedding-processing refers to processing for creating composite image information in which sub information (e.g., security information) is invisibly embedded into main image information which is visible by a human naked eye.

The electronic watermarking embedding-processing section 10 of FIG. 1 includes a layout processing section 107, a first image processing section 126, a second image processing section 127, a composing section 122, and a recording section 124.

The layout processing section 107 performs processing for producing layout information 108 in which first sub information 102 and second sub information 103 do not interfere with each other. The first sub information 102 is information of a state which can be understood directly by a human being. The second sub information 103 is information of a state which can not be understood directly by a human being.

The first image processing section 126 embeds the first sub information 102 into main image information 101 in an invisible state by using first key information 104. The first image processing section 126 embeds the first sub information 102 into the main image information 101 based on the layout information 108 created by the layout processing section 107.

The second image processing section 127 embeds the second sub information 103 into the main image information 101 in an invisible state by using second key information 105 which is different from the first key information 104. The second image processing section 127 embeds the second sub information 103 into the main image information 101 based on the layout information 108 created by the layout processing section 107.

The composing section 122 creates composite image information 123. The composing section 122 creates the composite image information 123 in which first overlapping image 114 acquired as a processing result of the first image processing section and second overlapping image 121 acquired as a processing result of the second image processing section are composed based on the layout information 108. The composite image information 123 is image information in which the first sub information 102 and the second sub information 103 are embedded in the main image information 101 in an invisible state.

The recording section 124 records (prints) the composite image information 123 created by the composing section 122 on a recording medium. The recording section 124 creates a recording material 125 as a recording medium with the composite image information 123 printed thereon.

The first image processing section 126 includes an edge extracting section 109, a phase modulating section 110, a first color difference modulating section 112, and a first overlapping section 113.

The edge extracting section 109 performs processing for extracting the edge from the first sub information 102. Here, the edge extracting section 109 performs edge extraction for the first sub information 103 which is two-value imaged.

The phase modulating section 110 performs phase modulation processing for the first key information 104. The phase modulating section 110 performs phase modulation processing for the first key information 104 based on the layout information 108 created by the layout processing section 107 and the first sub information 102.

The first color difference modulating section 112 performs color difference modulation processing for the first key information 104 which is phase-modulated by the phase modulating section 110. The first color difference modulating section 112 performs color difference modulation processing by using the predetermined color difference amount 111.

The overlapping section 113 overlaps the first key information 104 which is color difference-modulated by the first color difference modulating section 112 with the main image information 101. The first overlapping section 113 outputs to the composing section 122 first overlapping image information 114 in which the first key information 104 which is color difference-modulated and the main image information 101 are overlapped.

The second image processing section 127 includes a second color difference modulating section 116, a third color difference modulating section 118, a selecting and composing section 119, and a second overlapping section 120.

The second color difference modulating section 116 performs color difference modulation processing for the second key information 105. Here, the second color difference modulating section 116 color difference-modulates the second key information 105 which is two-value imaged by using the predetermined color difference amount 115.

The third color difference modulating section 118 performs color difference modulation processing for the third key information 106. The third color difference modulating section 118 color difference-modulates the third key information 105 which is two-value imaged by using the predetermined color difference amount 117.

The selecting and composing section 119 composes the second key information or the third key information which is color difference-modulated, based on the second sub information 103 and the layout information 108. The selecting and composing section 119 selects either of the second key information 105 which is color difference-modulated by the second color difference modulating section 116 and the third key information 106 which is color difference-modulated by the third color difference modulating section 118, based on the second sub information 103. For example, if the second sub information is information represented by a plurality of pieces of two-value information, the selecting and composing section 119 selects either of the second key information and the third key information according to each two-value information. The selecting and composing section 119 composes the second key information and the third key information which are selected according to the second sub information, based on the layout information 108.

The second overlapping section 120 overlaps a processing result of the selecting and composing section 119 and the main image information 101. The second overlapping section 120 outputs second overlapping image information 121 acquired by overlapping processing to the composing section 122.

In the configuration example of FIG. 1, as input information, there are the main image information 101, the first sub information (electronic watermarking information) 102, the second sub information (electronic watermarking information) 103, the first key information 104, the second key information 105, and the third key information 106.

The main image information 101 is an image which should be prevented from being counterfeited or tampered. The main image information 101 is image information which is recorded on a recording material in a visible state. For example, the main image information 101 is a facial image for certification which has to be recorded on an ID card.

The first sub information 102 and the second sub information 103 are information (electronic watermarking information) which is embedded into the main image information 101 in an invisible state. The first sub information 102 and the second sub information 103 as the electronic watermarking information are information which enhances security of the main image information 101. The first sub information 102 is information which can be understood directly by a human being. For example, the first sub information 102 includes a logo mark, a character, a diagram, and the like.

The second sub information 103 is information which can not be understood directly by a human being. For example, the second sub information 103 is machine-readable information like a two-dimensional code.

The first key information 104 is information used to embed the first sub information 102 into the main image information 101. The first key information 104 is information used to reconstruct the first sub information from the composite image information 123. The first key information 104 is information which has been prepared in advance.

The second key information 105 and the third key information 106 are information used to embed the second sub information 103 into the main image information 101. The second key information 105 and the third key information 106 are information used to reconstruct the second sub information 103 from the composite image information 123. The second key information 105 and the third key information 106 are information which has been prepared in advance.

Next, a processing operation of the electronic watermarking embedding-processing section 10 configured as described above will be described.

Figure 2:
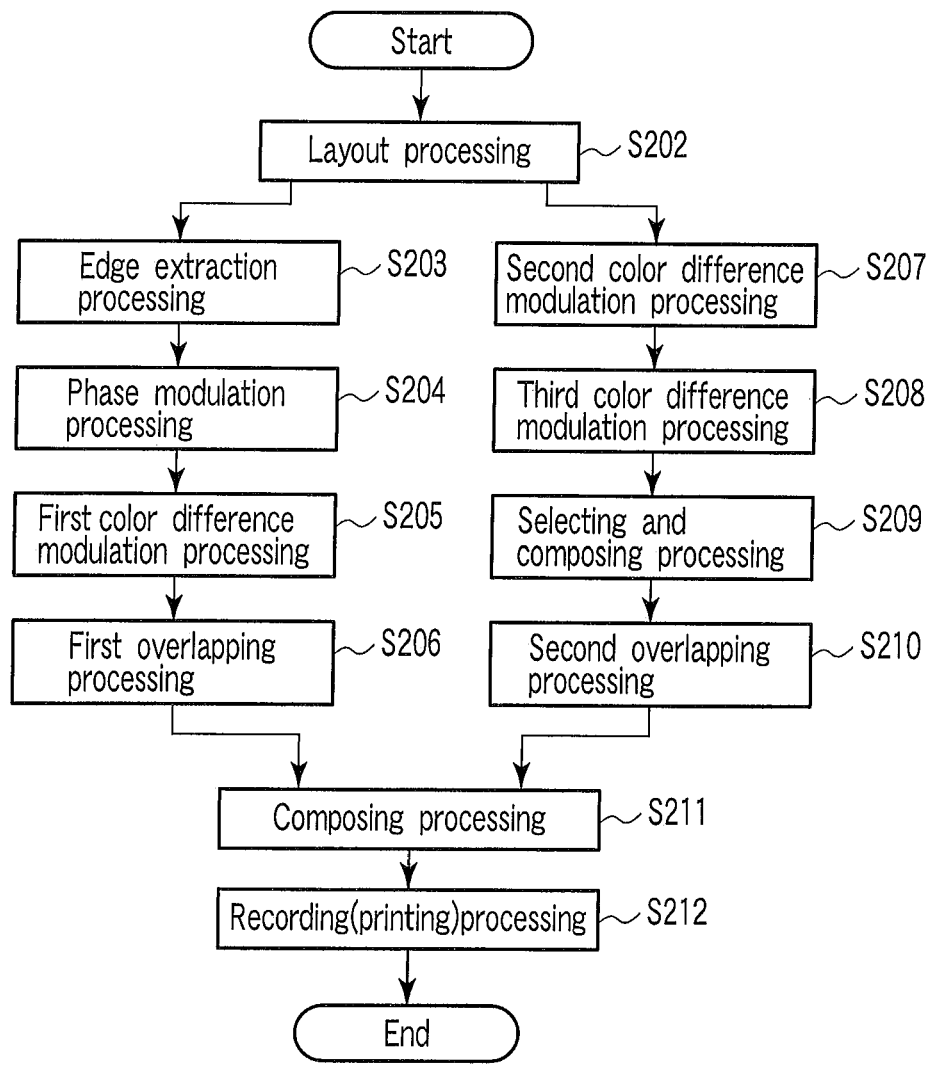
FIG. 2 is a flowchart schematically illustrating a processing flow of the electronic watermarking embedding-processing section.

FIG. 2 is a flowchart illustrating a processing flow of the electronic watermarking embedding-processing section 10.

The layout processing section 107 creates the layout information 108 based on the first sub information 102 and the second sub information 103 (step S202). After creating the layout information 108, the layout processing section 107 provides the layout information 108 to the phase modulating section 110 of the first image processing section 126, and the selecting and composing section 119 and the composing section 122 of the second image processing section 127.

Meanwhile, in the first image processing section 126, the edge extracting section 109 performs edge extraction processing for the first sub information 102 (step S203). The edge extracting section 109 extracts the edge of the first sub information 102 represented by a plurality of pieces of two-value information. When the edge of the first sub information 102 is extracted, the phase modulating section 110 phase-modulates the first key information, based on information which represents the edge extracted by the edge extracting section 109 and the layout information 108 created by the layout processing section 107 (step S204).

When the first key information is phase-modulated, the first color difference modulating section 112 performs color difference modulation processing for the phase-modulated first key information, based on the predetermined color difference amount (ΔCd) 111 (step S205). When the first key information which is color difference-modulated is acquired, the first overlapping section 113 overlaps the first key information which is color difference-modulated by the first color difference modulating section 112 with the main image information 101 (step S206). As a result, the first overlapping section 113 creates the first overlapping image information 114. The first overlapping section 113 provides the created first overlapping image information 114 to the composing section 122.

In the second image processing section 127, the second color difference modulating section 116 color difference-modulates the second key information 105 based on the predetermined color difference amount (ΔCd) 115 (step S207). Also, in the second image processing section 127, the third color difference modulating section 118 color difference-modulates the third key information 106 based on the predetermined color difference amount (ΔCd) 117 (step S208). Here, the second key information 105 and the third key information 106 are image information in which each pixel information is represented by two values.

The selecting and composing section 119 performs composite processing of the second key information 105 and the third key information 106 which are selected based on the layout information 108 and the second sub information 103 (step S209). The selecting and composing section 119 selects one of the second key information 105 and the third key information 106 with respect to each pixel information of the second sub information 103 layoutted according to the layout information 108. The selecting and composing section 119 composes the second key information 105 which is color difference-modulated by the second color difference modulating section 116 and the third key information 106 which is color difference-modulated by the third color difference modulating section 118, based on the selecting result for each pixel information of the second sub information 103.

When the second key information 105 and the third key information 106 which are color difference-modulated are composed by the selecting and composing section 119, the second overlapping section 120 overlaps the main image information 101 and the processing result of the selecting and composing section 119 (step S210). As a result, the second overlapping image information 121 is created by the second overlapping section 120. The second overlapping section 120 provides the created second overlapping image information 121 to the composing section 122.

By each processing described above, the first overlapping image information 114 which is the processing result of the first image processing section 126, the second overlapping image information 121 which is the processing result of the second image processing section 127, and the layout information 108 created by the layout processing section 107 are inputted to the composing section 122. The composing section 122, after receiving these pieces of information, composes the first overlapping image information 114 and the second overlapping image information 121 based on the layout information 108 (step S211). As a result, the composite image information 123 is created by the composing section 122.

The composite image information 123 created by the composing section 122 is provided to the recording section 124. When the composite image information 123 is supplied, the recording section 124 prints (records) the composite image information 123 onto a recording medium (step S212). As a result, a recording material 125 (e.g., ID card) with the composite image information 123 printed thereon is created by the recording section 124. The composite image information 123 printed on the recording material 125 is in a state that the main image information is visible by a human eye. The composite image information 123 printed on the recording material 125 is in a state that the first sub information embedded by using the first key information and the second sub information embedded by using the second key information and the third key information are invisible by a human eye.

Next, an example of the recording material 125 created by the above-mentioned processing will be described.

Figure 3:
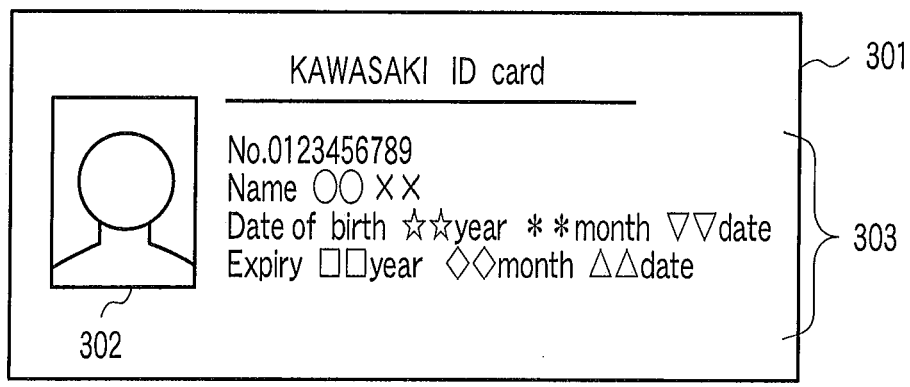
FIG. 3 is a view illustrating an example of an ID card as one example of a recording material.

FIG. 3 is a view illustrating an example of an ID card 301 as one example of the recording material 125.

On the ID card 301 of FIG. 3, a facial image 302 as the main image information 101 is printed. The facial image 302 is a facial image of, for example, an owner of the corresponding ID card 301. The facial image 302 is image information for authenticating a person with a human eye. On the ID card 301 of FIG. 3, personal information 303 such as an identification number (ID number), a name, a birth date, and an expiry date are printed (recorded). The personal information 303 includes identification information of the corresponding ID card 301 and information about an owner of the corresponding ID card 301 (i.e., information about a person of the facial image 302).

Electronic watermarking information (first sub information 102 and second sun information 103) is embedded into the facial image 302 by electronic watermarking processing described above. Information based on the personal information 303 may be used as the electronic watermarking information. If the personal information 303 is used as the electronic watermarking information, the electronic watermarking information reconstructed from the facial image 302 is associated with the personal information 303. This makes it easy to confirm the validity of the reconstructed information.

For example, since the first sub information 102 is information which can be seen by a human eye as described above, it is possible to easily confirm whether the reconstructed first sub information 102 and the personal information 303 are identical to each other or not. Also, the second sub information 103 is assumed to be machine-readable information. Therefore, if the personal information 303 is judged by OCR processing, in a device like a computer, it is possible to easily confirm whether the reconstructed second sub information 102 and the personal information 303 are identical to each other or not.

By associating the electronic watermarking information with the personal information 303 as described above, the validity of the reconstructed information can be easily confirmed, and partial counterfeiting and tampering of the ID card 301 can be prevented. That is, when the personal information 303 is used as the electronic watermarking information, the security of the ID card 301 can be improved.

Next, processing operations of the respective components described above will be described in detail.

First, edge extraction processing of the edge extracting section 109 will be described.

As edge extraction processing of the edge extracting section 109, various methods can be applied. For example, the edge extracting section 109 may employ a method for extracting the edge by acquiring a moving average in a plurality of reference areas for each predetermined size. Here, as a reference area E, an area of 3×1 pixels composed of three pixels of a main scanning direction (x direction) and one pixel of a sub scanning direction (y direction) is considered. In this instance, a moving average value can be computed by Equation (A-1).

$$E(i, j) = \text{a moving average value} \quad (A\text{-}1)$$

The moving average value E(i, j) computed by Equation (A-1) is information which represents an edge extraction processing result for a pixel (i, j). For example, the moving average value E(i, j) of the first sub information as image information with two-value image information can be determined as follows:

E (i, j)≠0 or 1: edge area of the first sub information.

E (i, j)=0: background area of the first sub information (white pixel).

E( i, j)=1: image area of the first sub information (black pixel).

Next, the phase modulating section 110 will be described.

The phase modulating section 110 performs phase modulation processing for phase-modulating the first key information. The processing result of the edge extracting section 109, the layout information and the first key information 104 are inputted to the phase modulation section 110. The processing result of the edge extracting section 109 is information obtained by edge-processing the first sub information 102. The layout information 108 is information which represents an embedding location of the first sub information 102. The layout information 108 will be described later in detail. Here, as the first key information 104, two-value imaged information is used.

The phase modulating section 110 processes these pieces of information according to Equations (B-1) to (B-3):

$$E(i, j)=0: PM(i, j)=\text{KEY1}(i) \quad (B\text{-}1)$$

$$E(i, j)\neq 0 \text{ or } 1: PM(i, j)=\text{KEY1}(i+2) \quad (B\text{-}2)$$

$$E(i, j)=1: PM(i, j)=\text{KEY1}(i+1) \quad (B\text{-}3)$$

Here, E (i, j) is the edge extraction processing result of the pixel (i, j), PM (i, j) is the phase modulating result of the pixel (i, j), and KEY1 (i, j) is the first key information of the pixel (i, j).

Next, the first to third color difference modulating sections 112, 116 and 118 will be described.

FIGS. 4A to 4E are views illustrating color difference modulation processing of the first to third color difference modulating sections 112, 116 and 118.

As shown in FIG. 1, in color difference modulation processing, given information is color difference-modulated by using the predetermined color difference amount. That is, the first to third color difference modulating sections 112, 116 and 118 perform color difference modulation processing for color difference-modulating by using the first to third color difference amounts 111, 115 and 117. For example, the first color difference modulating section 112 color difference-modulates information acquired as the phase modulation processing result by using the first color difference amount 111. The second color difference modulating section 116 color difference-modulates the second key information 105 by using the second color difference amount 115. The third color difference modulating section 118 color difference-modulates the third key information 106 by using the third color difference amount 117.

Figures 4A, 4B, 4C, 4D, 4E:
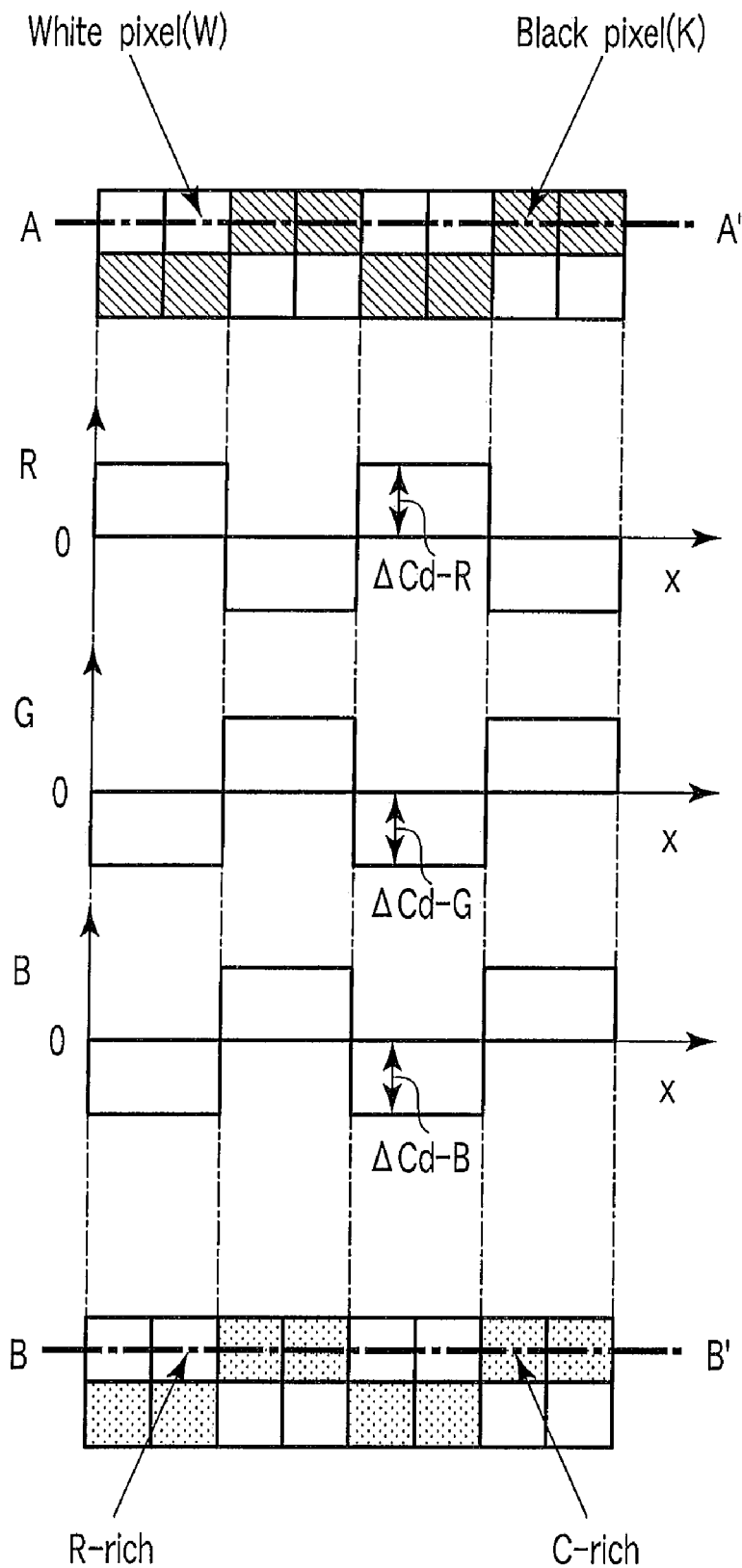
FIG. 4A is a view illustrating an area of 8 pixels×2 pixels in a two-value image as the key information.
FIG. 4B shows a value of an R component obtained as a color difference modulation processing result.
FIG. 4C shows a value of a G component obtained as the color difference modulation processing result.
FIG. 4D shows a value of a B component obtained as the color difference modulation processing result.
FIG. 4E shows a composition of the R, G and B components obtained as the color difference modulation processing result.

FIG. 4A is a view illustrating a certain area (transverse 8 pixels×vertical 2 pixels) in a two-value image as the key information. In FIG. 4A, a non-hatched section represents a white pixel (W), and a hatched section represents a black pixel (K). As the color difference amount ΔCd, three components of R, G and B have $\Delta Cd_{-R}$, $\Delta Cd_{-G}$, and $\Delta Cd_{-B}$, respectively. In case of a 8-bit operation, $255 \geq \Delta Cd_{-R}$, $\Delta Cd_{-G}$, and $\Delta Cd_{-B} \geq 0$.

The color difference modulating sections 112, 116 and 118 are color modulating processors and compute three components of R, G and B separately according to Equations (C-1) to (C-6):

In case of KEY (i, j)=W $$CDMRSLT(i, j)_{-R} = +\Delta Cd_{-R} \quad (C\text{-}1)$$

$$CDMRSLT(i, j)_{-G} = -\Delta Cd_{-G} \quad (C\text{-}2)$$

$$CDMRSLT(i, j)_{-B} = -\Delta Cd_{-B} \quad (C\text{-}3)$$

In case of KEY (i, j)=K $$CDMRSLT(i, j)_{-R} = -\Delta Cd_{-R} \quad (C\text{-}4)$$

$$CDMRSLT(i, j)_{-G} = +\Delta Cd_{-G} \quad (C\text{-}5)$$

$$CDMRSLT(i, j)_{-B} = +\Delta Cd_{-B} \quad (C\text{-}6)$$

KEY (i, j): Key information, and CDMRSLT(i, j): color difference modulation processing result.

Also, the larger the value of the color difference amount ΔCd, the lower the degree of a reconstruction difficulty when the electronic watermarking is reconstructed. For example, if a value of the color difference amount ΔCd is very large, sub information is easily exposed. For example, a value of the color difference amount ΔCd preferably satisfies a condition of "γ" shown in Equation (D-1).

$$(\text{Maximum luminance value}/2) \geq \gamma > 0 \quad (D\text{-}1)$$

FIGS. 4B, 4C, 4D, and 4E are views illustrating the color difference modulating processing result by Equations described above. FIG. 4B shows a value of an R component $CDMRSLT_{-R}$ obtained as the color difference processing result. FIG. 4C shows a value of a G component $CDMRSLT_{-G}$ obtained as the color difference processing result. FIG. 4D shows a value of a B component $CDMRSLT_{-B}$ obtained as the color difference processing result. FIG. 4E shows a composition of the R, G and B components obtained as the color difference processing result. A-A' of FIG. 4A corresponds to B-B' of FIG. 4E.

By color difference modulation processing described above, a section corresponding to a white pixel (W) becomes a red component rich (R-rich), and a section corresponding to a black pixel (K) becomes a cyan component rich (C-rich). Red and cyan have a subtractive complementary color relationship. Therefore, a color recognized by adding the two becomes an achromatic color.

That is, by setting such a pixel pitch to a high resolution (equal to or more than about 300 dpi) which exceeds a range which can be detected by a human naked eye, the color difference modulation processing result of FIG. 4E becomes an achromatic color (gray) because red and cyan are not discriminated by the naked eyes. Using such a characteristic, a pattern of image information like the key information is converted into a color difference information pattern to thereby be replaced with seeming achromatic color information.

Also, a combination of colors converted to an achromatic color is not limited to a combination of red and cyan, and it may be a combination of colors which have a complementary color relationship. For example, it may be a combination of different colors like green and magenta, and blue and yellow.

Also, colors respectively allocated to a white pixel and a black pixel are relative. For example, it is not limited to that red is allocated to a white pixel and cyan is allocated to a black pixel as in the above-mentioned example, but colors may be reversely allocated.

Next, the first overlapping section 113 and the second overlapping section 120 will be described.

In the first image processing section 126, the first overlapping section 113 performs overlapping processing for overlapping the main image information 101 with information which is color difference-modulated by the first color difference modulating section 112. That is, the first overlapping section 113 embeds the first sub information which has undergone various processing into the main image information 101 at an embedding location of the first sub information specified by the layout information. The first image processing section 126 outputs the first overlapping image information 114 acquired by overlapping processing of the first overlapping section 113 as the first image processing result.

In the second image processing section 127, the second overlapping section 120 performs overlapping processing for overlapping the main image information 101 with the processing result of the selecting and composing section 119. That is, the first overlapping section 113 embeds the second sub information which has undergone various processing into the main image information 101 at an embedding location of the second sub information specified by the layout information. The second image processing section 127 outputs the second overlapping image information 121 acquired by overlapping processing of the second overlapping section 120 as the second image processing result.

As overlapping processing, the overlapping sections 113 and 120 compute, for example, three components of R, G and B according to Equations (E-1) to (E-3), respectively:

$$DES_{[k]}(i,j)_{-R} = SRC(i,j)_{-R} + SRC2_{[k]}(i,j)_{-R} \quad (E\text{-}1)$$

$$DES_{[k]}(i,j)_{-G} = SRC(i,j)_{-G} + SRC2_{[k]}(i,j)_{-G} \quad (E\text{-}2)$$

$$DES_{[k]}(i,j)_{-B} = SRC(i,j)_{-B} + SRC2_{[k]}(i,j)_{-B} \quad (E\text{-}3)$$

Here, k=first image processing section or second image processing section,
$DES_{[k]}(i,j)$: composite image information
$SRC(i,j)$: main image information
$SRC2_{[k]}(i,j)$: k=first image processing section,
$SRC2(i,j)$=processing result of first color difference modulating section
k=second image processing section,
$SRC2(i,j)$=processing result of selecting and composing section
(i, j): coordinate value of each pixel (i=0 to (Width−1), j=0 to (Height−1))

In Equations (E-1) to E-3), macroscopically SRC2 is difficult to be discriminated by a human naked eye and so looks achromatic. For this reason, when R, G and B components are composed, the main image information and the composite image information look almost the same to a human being as in Equations (F-1) and (F-2):

$$SRC2_{[k]} \approx 0 \quad (F\text{-}1)$$

$$DES \approx SRC \quad (F\text{-}2)$$

Next, the composing section 122 and the recording section 124 will be described.

The composing section 122 performs composite processing for composing the first overlapping image information 114 and the second overlapping image information 121. The composing section 122 composes the first sub information embedded in the first overlapping image information 114 and the second sub information embedded in the second overlapping image information 121 as they are. That is, the composing section 122 creates the composite image information 123 in which the first sub information and the second sub information 103 are invisibly embedded in the main image information 101 of a visible state with a layout in which the first sub information 102 and the second sub information 103 do not interfere with each other. The composing section 122 provides the created composite image information 123 to the recording section 124.

The recording section 124 performs recording processing for printing the composite image information 123 on a recording medium. That is, the recording section 124 performs processing for creating the recording material 125 in which the composite image information 123 supplied from the composing section 122 is printed. In the recording material 125 created by the recording section 124, printed is the composite image information 123 in which the first sub information 102 and the second sub information 103 are embedded in the main image information 101 as the electronic watermarking of an invisible state.

Figure 5A:
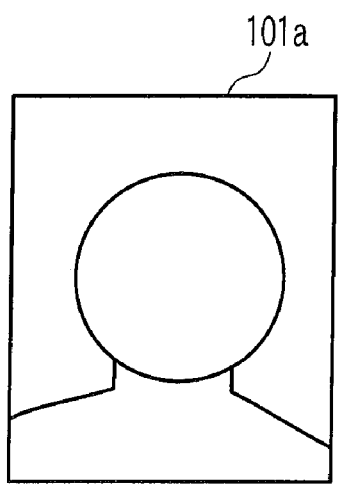
FIG. 5A is a view illustrating an example of main image information.
Figure 5B:
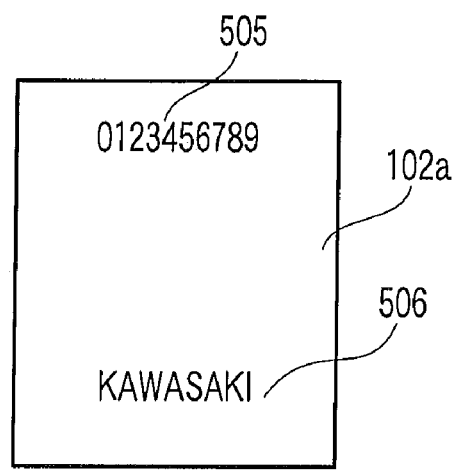
FIG. 5B is a view illustrating an example of first sub information which is two-value image information.
Figure 5C:
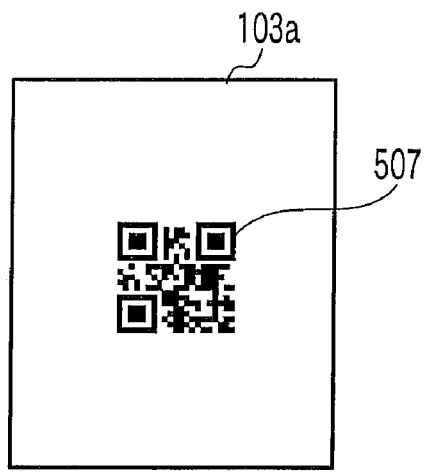
FIG. 5C is a view illustrating an example of second sub information which is two-value image information.
Figure 5D:
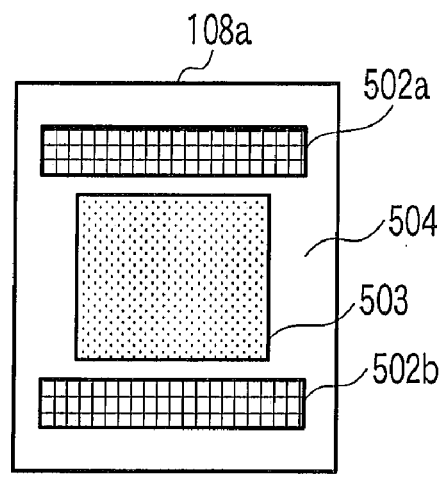
FIG. 5D is a view illustrating an example of layout information.

FIG. 5A is a view illustrating an example of the main image information 101. FIG. 5B is a view illustrating an example of the first sub information 102 which is two-value image information. FIG. 5C is a view illustrating an example of the second sub information 103 which is two-value image information. FIG. 5D is a view illustrating an example of the layout information 108.

The main image information 101 of FIG. 5A is a facial image for individual certification which should be printed on, for example, an ID card as the recording material 125.

The first sub information 102 of FIG. 5B is two-value image information which can be understood directly by a human being. In the example of FIG. 5B, an image 505 of a digit string and an image 506 of a character string are the first sub information 102. For example, the image 505 of a digit string is an image which represents a serial number of an ID card as the recording material 125. The image 506 of a character string is an image which represents a company name which is an issuer of an ID card as the recording material 125.

As shown in FIG. 5B, as the first sub information 102, used is image information which can be understood directly by a human being like a logo mark, a character, and a diagram. The first sub information 102 is given as two-value image information.

Locations of the main image information 101 where the image 505 of a digit string and the image 506 of a character string as the first sub information 102 are embedded are specified by the layout information 108 (e.g., layout information of FIG. 5D) which will be described later.

The second sub information 103 of FIG. 5C is two-value image information which can not be understood directly by a human being. In the example of FIG. 5C, an image 507 of a machine readable two-dimensional code is the second sub information 103. The two-dimensional code as the second sub information 103 may be an image in which information (e.g., a digit string which represents a serial number of an ID card, a character string which represents an issuer of an ID card, or a character string which represents an owner of an ID card) contained in the first sub information 102 is two-dimension coded. In this instance, the first sub information 102 and the second sub information 103 are associated with each other.

As shown in FIG. 5C, as the second sub information 103, for example, image information which can not be understood directly by a human being like a barcode or a two-dimensional code is used. Also, the second sub information 103 is acquired as two-value image information. The second sub information 103 like a barcode or a two-dimensional code is information which is recognized by a recognition program with a predetermined algorithm. In the case where image information in which the first sub information 102 is two-dimension coded is used as the second sub information 103, the first sub information 102 may be acquired from the second sub information 103 by the recognition program.

FIG. 5D shows an example of the layout information 108 created by the layout processing section 107. The layout information 108 has the same size as the main image information 101. The layout information 108 indicates an area (first area) of embedding the first sub information and an area (second area) of embedding the second sub information in the main image information 101. The layout information 108 is set such that an area for embedding the first sub information and an area for embedding the second sub information do not overlap so that the first sub information and the second sub information do not interfere with each other. In FIG. 5D, lattice pattern areas 502a and 502b are areas for embedding the first sub information 102, and a dot pattern area 503 is an area for embedding the second sub information 103. In FIG. 5D, a white background section 504 represents an area where no electronic watermarking is embedded. Also, in the example of FIG. 5D, the lattice pattern area 502a is an area for embedding the image 505 of a digit string of FIG. 5B, and the lattice pattern 502b is an area for embedding the image 506 of a character string of FIG. 5B.

Next, electronic watermarking reconstruction processing for reconstructing the electronic watermarking embedded as described above will be described.

Figure 6:
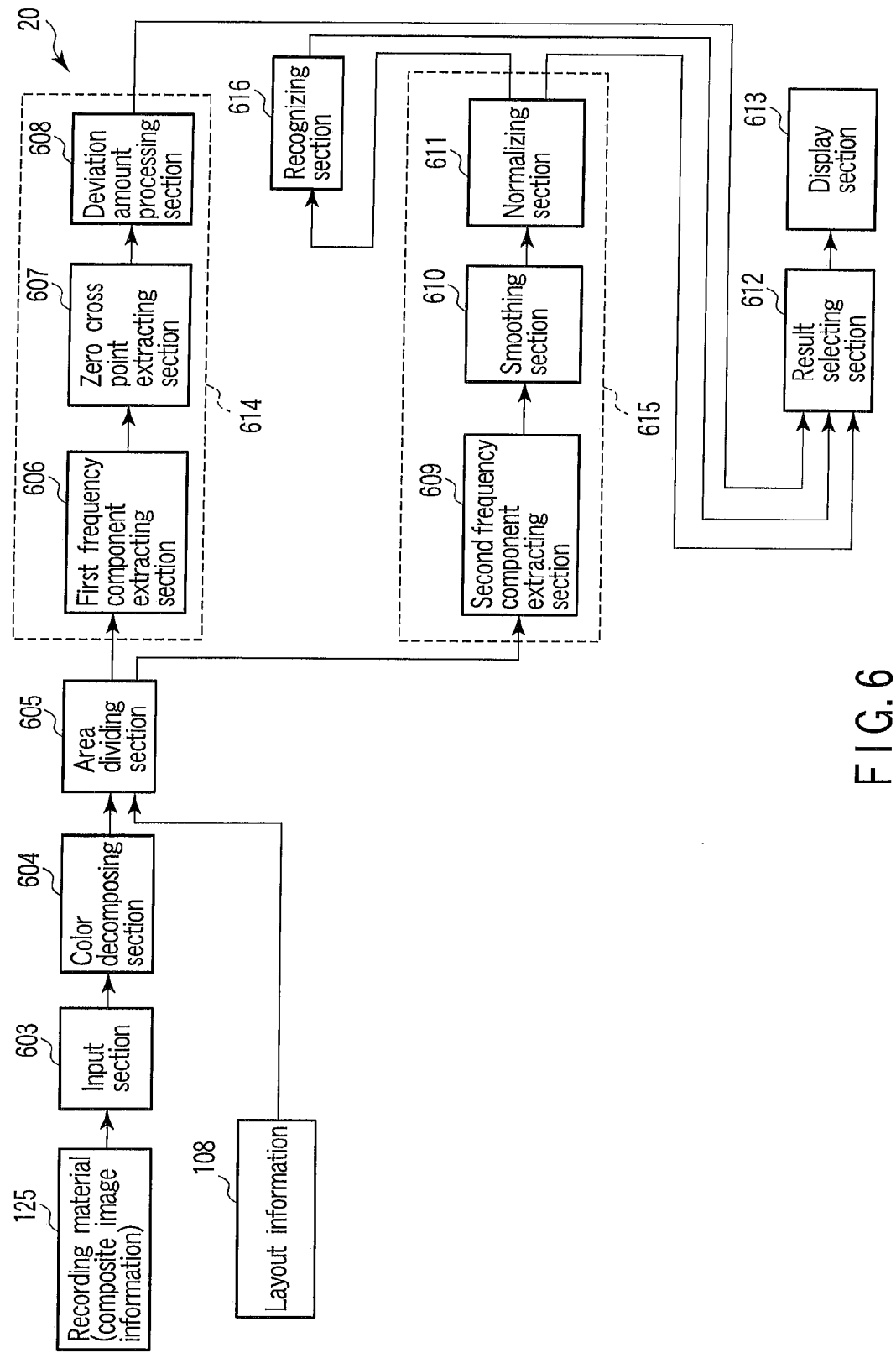
FIG. 6 is a schematic view illustrating a configuration example of an electronic watermarking reconstruction processing section according to the first embodiment of the present invention.

FIG. 6 is a schematic view illustrating a configuration example of an electronic watermarking reconstruction processing section 20 of the image processing device according to the first embodiment of the present invention.

The electronic watermarking reconstruction processing section 20 performs electronic watermarking reconstruction processing for reconstructing electronic watermarking information from an image recorded on the recording material. For example, the electronic watermarking reconstruction processing section 20 reconstructs the first sub information 102 and the second sub information 103 from the recording material 125 created by the electronic watermarking embedding-processing section 10 of FIG. 1.

As shown in FIG. 6, the electronic watermarking reconstruction processing section 20 includes an input section 603, a color decomposing section 604, an area dividing section 605, a first reconstructing section 614, a second reconstructing section 615, a recognizing section 616, a result selecting section 612, and a display section 613.

The input section 603 acquires image information which is a reconstruction target of the electronic watermarking information. The input section 603 receives image information in which an image on the recording material is optically read. The input section 603 reads out, for example, the composite image information 123 recorded on the recording material 125 and converts it to digital image information.

The color decomposing section 604 decomposes the image information inputted by the input section 603 into individual color components. In other words, the color decomposing section 604 creates image information for each color component (also called each color image information) from the image information inputted by the input section 603.

The area dividing section 605 divides the image information of each color created by the color decomposing section 604 to a plurality of areas based on the layout information 108. As described above, the layout processing section 107 creates the layout information 108 which represents the area (first area) for embedding the first sub information 102 and the area (second area) for embedding the second sub information 103. That is, the area dividing section 605 divides the image information of each color obtained by the color decomposing section 604 to the first area and the second area, based on the layout information 108.

The first reconstructing section 614 performs first reconstruction processing for reconstructing the first sub information from the image information of the first area obtained by the area dividing section 605. The first reconstructing section 614 reconstructs the first sub information 102 from the image information of the first area by using the first key information 104.

The second reconstructing section 615 performs second reconstruction processing for reconstructing the second sub information from the image information of the second area obtained by the area dividing section 605. The second reconstructing section 615 reconstructs the second sub information 103 from the image information of the second area by using the second key information 105 or the third key information 106.

The recognizing section 616 performs recognition processing for recognizing information from the image information reconstructed as the second sub information 103 by the second reconstructing section 615. That is, the recognizing section 616 performs predetermined recognition processing for the image (reconstructed image) which is the processing result of the second reconstructing section 615. The recognizing section 616 provides the recognition processing result to the result selecting section 612.

The result selecting section 612 determines whether or not information which is like the second sub information (proper information as the second sub information) is recognized by the recognizing section 616. If it is determined that the information which is like the second sub information is recognized by the recognizing section 616 (if recognition is successful), the result selecting section 612 outputs the recognition result (the second sub information recognized from the reconstructed image information) of the recognizing section 161 as the reconstruction processing result for the electronic watermarking information. If it is determined that the information which is like the second sub information is not recognized by the recognizing section 616 (if recognition fails), the result selecting section 612 outputs the image information reconstructed as the first sub information 102 by the first reconstructing section 614 as the reconstruction processing result for the electronic watermarking information.

In the first embodiment of the present invention, the first sub information 102 is information which can be understood as image information by a human being like a digit, a character, or a diagram, and the second sub information 103 is information which can not be understood as image information by a human being like a barcode or a two-dimensional code.

The display section 613 displays the reconstruction processing result information supplied from the result selecting section 612 on a display device. For example, if the recognition result of the recognizing section 616 is supplied from the result selecting section 612 (if recognition by the recognizing section 616 is successful), the display section 613 displays information recognized as the second sub information 103 by the recognizing section 616. Also, if the processing result of the first reconstructing section 614 is supplied from the result selecting section 612 (if recognition by the recognizing section 616 fails), the display section 613 displays image information reconstructed as the first sub information 102 by the first reconstructing section 614.

Next, a configuration example of the first reconstructing section 614 will be described.

The first reconstructing section 614 includes a first frequency component extracting section 606, a zero cross point extracting section 607, and a deviation amount processing section 608. The first frequency component extracting section 606 extracts a frequency component of the first key information 104 from a frequency distribution of the image information of the first area divided by the area dividing section 605. The zero cross point extracting section 607 extracts a zero cross point from the frequency component extracted by the first frequency component extracting section 606. The deviation amount processing section 608 computes the deviation amount of from a reference phase based on the zero cross point extracted by the zero cross point extracting section 607 with respect to each coordinate of a spatial frequency component of the image information of the first area. The deviation amount processing section 608 divides to the coordinates in which the computed deviation amount deviates by the predetermined amount or more and the coordinates in which the computed deviation amount deviates by less than the predetermined amount. The deviation amount processing section 608 creates a reconstruction image based on the coordinates classified according to the deviation amount.

The second reconstructing section 615 includes a second frequency component extracting section 609, a smoothing processing section 610, and a normalization processing section 611. The second frequency component extracting section 609 extracts a frequency component of the second key information 105 or the third key information 106 from the frequency distribution of the color image information of the second area divided by the area dividing section 605. The smoothing processing section 610 performs smoothing for the frequency component extracted by the second frequency component extracting section 609. The normalization processing section 611 performs normalization for the processing result of the smoothing processing section 610.

Next, a processing flow of the electronic watermarking reconstruction processing section 20 with the above-described configuration will be schematically described.

Figure 7:
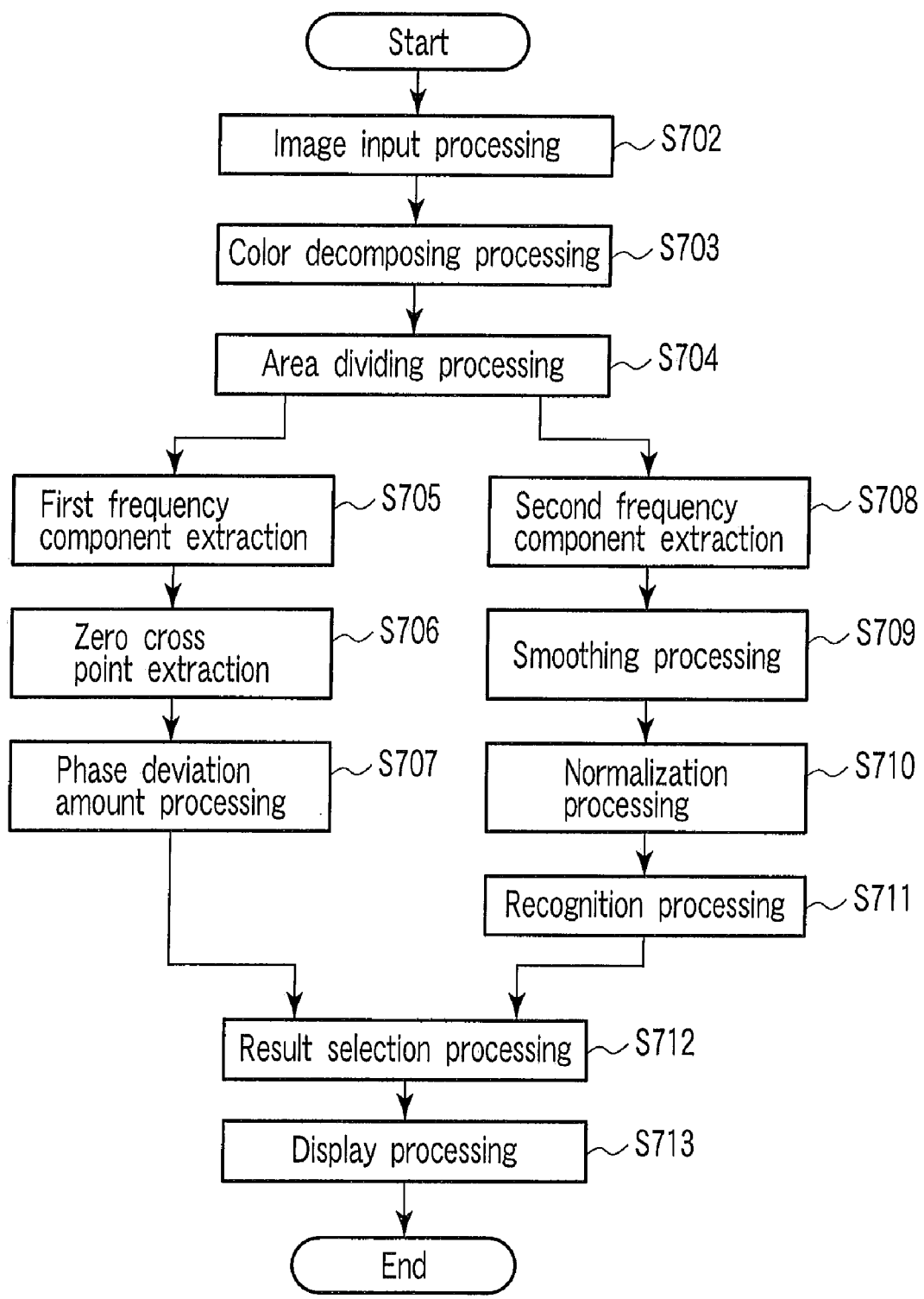
FIG. 7 is a flowchart illustrating schematically a flow of electronic watermarking reconstruction processing.

FIG. 7 is a flowchart illustrating schematically a flow of electronic watermarking reconstruction processing of the electronic watermarking reconstruction processing section 20.

First, the input section 603 receives image information which is optically read out from the image on the recording material (step S702). For example, the input section 603 receives digital image information which is optically read out from the composite image information 123 recorded on the recording material 125. The color decomposing section 604 color-decomposes the image information inputted by the input section 603 into a plurality of color components like three colors of R, G and B or three colors of C, M and Y (step S703). Here, as the image information of the color component, a so-called color plane is used.

The area dividing section 605 divides each color plane which is color-decomposed by the color decomposing section 604 to the first area and the second area based on the layout information 108 (step S704). The first area is an area for embedding the first sub information 102 which is specified by the layout information 108. The second area is an area for embedding the second sub information 103 which is specified by the layout information 108.

The first reconstructing section 614 performs processing for reconstructing the first sub information 102 from each color plane of the first area divided by the area dividing section 605 (steps S705 to S707). The first reconstructing section 614 creates the reconstructed image information by using the first key information 104 as the reconstruction result of the first sub information 102. That is, when the first sub information 102 is properly embedded in the image inputted by the input section 601, the first reconstructing section 614 reconstructs the first sub information which can be understood in an image state by a human being.

That is, in the first reconstructing section 614, the first frequency component extracting section 606 extracts the spatial frequency component of the first key information 104 with respect to each color plane of the first area divided by the area dividing section 605 (step S705). The zero cross point extracting section 607 extracts the zero cross point (=a point at which a sign changes) from the spatial frequency component extracted by the first frequency component extracting section 606 (step S706). The deviation amount processing section 608 projects the zero cross point extracted by the zero cross point extracting section 607 to obtain the reference phase of the spatial frequency component. The deviation amount processing section 608 computes the deviation amount from the reference phase with respect to each coordinate of the spatial frequency component. The deviation amount processing section 608 replaces a pixel value of the coordinates at which the computed deviation amount deviates by a predetermined threshold value or more with a black, and replaces a pixel value of the coordinates at which the computed deviation amount deviates by less than the predetermined threshold value with a white (step S707). By above-described processing, the first reconstructing section 614 creates the first reconstruction image information.

Also, the second reconstructing section 615 performs processing for reconstructing the second sub information 103 from each color plane of the second area divided by the area dividing section 605 (steps S708 to S711). The second reconstructing section 615 reconstructs the image information of the second sub information 103 by using the second key information 105 and the third key information 106, and performs predetermined recognition processing to recognize the information represented by the reconstructed image information. That is, when the second sub information 103 is properly embedded in the image inputted by the input section 601, the second reconstructing section 615 obtains the second sub information 103 as the recognition result of the image information reconstructed as the second sub information 103.

That is, in the second reconstructing section 615, the second frequency component extracting section 609 extracts the spatial frequency component of the second key information 105 or the third key information 106 with respect to each color plane of the second area divided by the area dividing section 605 (step S708). The smoothing processing section 610 performs smoothing processing for the spatial frequency component extracted by the second frequency component extracting section 609 (step S709). The normalization processing section 611 performs normalization processing for the processing result of the smoothing processing section 610 so that an input value can be in a range of a brightness value of "0" to "255" (in case of 8-bit processing) (step S710). By above-described processing, the second reconstructing section 615 creates the second reconstruction image information.

When the second reconstruction image information is created, in the second reconstructing section 615, the recognizing section 616 performs predetermined recognition processing for the second reconstruction image information normalized by the normalization processing section 611 (step S711). The second reconstructing section 615 outputs, as the reconstructing result of the second sub information 103, the second reconstruction image information created by the normalization processing section 611 and the recognition processing result for the second reconstruction image information by the recognizing section 616.

The result selecting section 612 receives the first reconstruction image information from the first reconstructing section 614, and the second reconstruction image information and the recognizing result for the second reconstruction image information from the second reconstructing section 615. The result selecting section 612 selects information to be outputted as the reconstruction result of the electronic watermarking information depending on whether the recognizing result of the second reconstruction image information is proper as the second sub information 103 or not (step S712).

For example, if it is determined that the recognizing result of the second reconstruction image information is proper as the second sub information 103, the result selecting section 612 outputs the recognizing result of the second reconstruction image information as the reconstructing result of the electronic watermarking information to the display section 613. However, if it is determined that the recognizing result of the second reconstruction image information is not proper as the second sub information 103, the result selecting section 612 outputs the first reconstruction image information as the reconstructing result of the electronic watermarking information to the display section 613. The display section 613 displays the reconstructing result of the electronic watermarking information supplied from the result selecting section 612 on the display device (step S713).

Next, the key information (first, second and third key information) 104, 105 and 106 will be described.

FIG. 8A is a view illustrating an example of the first key information 104 expressed by a binary number. FIG. 8B shows an example of the first key information (first key image information) 104 which is two-value image information. FIG. 8C is a view illustrating an example of the second key information 105 expressed by a binary number. FIG. 8D shows an example of the second key information (second key image information) 105 which is two-value image information. FIG. 8E is a view illustrating an example of the third key information 106 expressed by a binary number. FIG. 8F shows an example of the third key information (third key image information) 106 which is two-value image information.

The key information of FIGS. 8A, 8C and 8E is expressed by a 16-digit binary number. In the key information of FIGS. 8A, 8C and 8E, the two-value image information is obtained by converting "0" to a white pixel and "1" to a black pixel. In FIGS. 8B, 8D and 8F, a pixel of a first color (e.g., white) is represented by a white (non hatched section), and a pixel of a second color (e.g., black) is represented by a hatched section.

Also, the image information of FIGS. 8B, 8D and 8F is also called the key image information. As can be seen in FIGS. 8A to 8F, the key information and the key image information are essentially the same information.

As described above, as the first to third key information 104, 105 and 106, a two-value image (here, black-white image) converted from information composed of a two-value bit string may be used. Also, as the first to third key information, a two-value image with a geometric shape, a two-value image converted from a (pseudo) random number pattern created based on a previously stored seed, or a binary number converted from an ASCII code which is converted from a certain term may be used.

Also, the first key information 104 is used in the first image processing section 126 of FIG. 1. The second key information 105 and the third key information 106 are used in the second image processing section 127 of FIG. 1. Therefore, all of the first key information 104, the second key information 105 and the third key information 106 do not need to have the same size. However, it is preferred that the second key information 105 and the third key information 106 have the same size in order to achieve a simple or rapid computation.

Next, extraction processing for the frequency component will be described.

Figure 9:
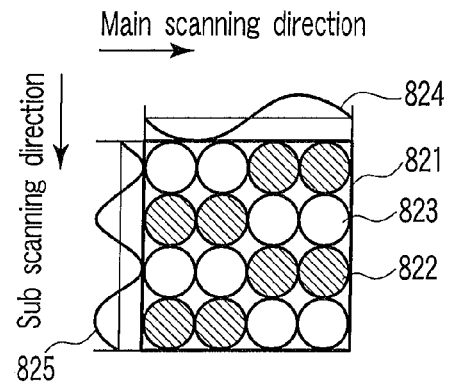
FIG. 9 is a view schematically illustrating a state that key information is recorded on a recording material.

FIG. 9 is a view illustrating a state that the first key information 104 of FIG. 8B is recorded on the recording material. FIG. 9 shows the frequency component in a main scanning direction and a sub scanning direction. In the example of FIG. 9, in an area 821 composed of 4×4 pixels, a white circle 823 represents a dot for recording a white pixel, and a hatched circle 822 represents a dot for recording a black pixel.

A wave 824 with a concave wave and a convex wave like a sine wave of exactly one cycle exists in the area 821 of FIG. 9 in the main scanning direction. A wave 825 like a sine wave of two cycles exists in the area 821 of FIG. 9 in the sub scanning direction.

That is, in electronic watermarking reconstruction processing, the frequency component of the wave of the main scanning direction and the frequency component of the wave of the sub scanning direction which are specific to the first key image information 104 are detected with respect to the image information (image information containing the composite image information) read from the recording material 125. As a result, in electronic watermarking reconstruction processing, the first sub information 102 embedded as the electronic watermarking can be reconstructed by using the first key image information 104.

Also, the second key image information 105 and the third key image information 106 can be detected in the same way. Therefore, in electronic watermarking reconstruction processing, the second sub information 103 which is the image information embedded as the electronic watermarking can be reconstructed by using the second key image information 105 and the third key image information 106.

Figures 10A, 10B, 10C:
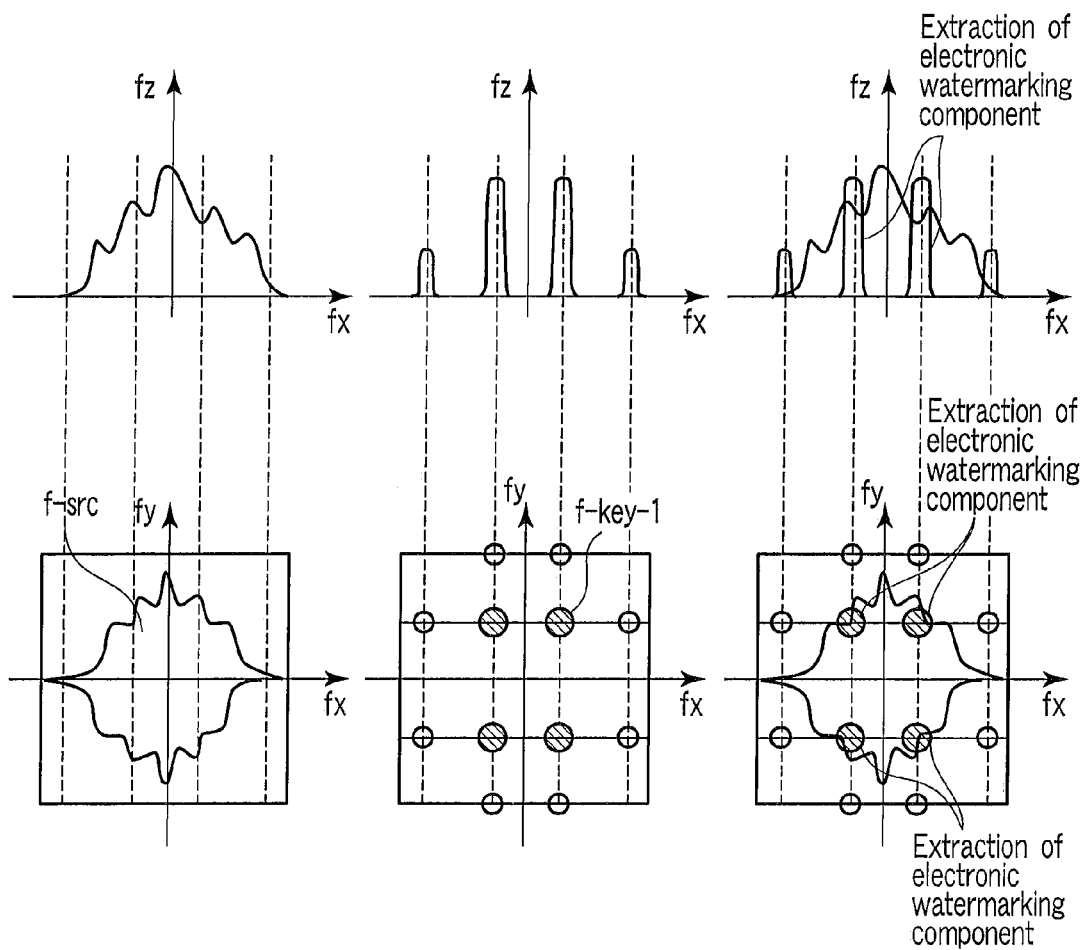
FIG. 10A is a view illustrating a spatial frequency area distribution of the main image information.
FIG. 10B shows a spatial frequency area distribution which represents a result of phase modulation and color difference modulation of the first key image information.
FIG. 10C is a view illustrating a spatial frequency area distribution for composite image information.

FIGS. 10A to 10C are schematic views illustrating processing for converting the composite image information 123 from a spatial area to a frequency area.

FIG. 10A is a view illustrating a spatial frequency area distribution of the main image information 101. FIG. 10B shows a spatial frequency area distribution which represents the processing results of the first key image information 104 by the phase modulating section 110 and the first color difference modulating section 112. To be exact, FIG. 10B shows a frequency area expression of embedded information other than a frequency area of the first key image information 104. In color difference modulation processing, a frequency of the key image information is converted into embedded information as it is without undergoing any change in light of a color plane of one of R, G and B. For this reason, "frequency area expression of key information=frequency expression of embedded information" makes sense.

FIG. 10C is a view illustrating a spatial frequency area distribution of the composite image information 123 which is the overlapping processing result. In FIG. 10C, fx and fy denote the two-dimensional frequency coordinates, and fz denotes an amplitude (intensity) of the frequency component. However, a frequency distribution of the first overlapping image information 114 specified by the layout information 108 is processed actually. That is, according to the frequency distribution shown in FIG. 10C, the frequency component of the key image information is extracted by frequency component extraction processing of the first frequency component extracting section 606. By above-described processing, the first sub information (electronic watermarking information) embedded in the main image information 101 is reconstructed by using the first key information. Also, by the same processing as described above, the second sub information 103 embedded in the main image information 101 is reconstructed by using the second key information 105 and the third key information 106.

Next, processing operations of the respective components of the first reconstructing section 614 will be described.

FIG. 11 is a view illustrating an example of an image area composed of 8×8 pixels in key image information 1101. In the example of FIG. 11, a white circle 1102 represents a dot for recording a white pixel, and a black circle 1103 represents a dot for recording a black pixel.

The key image information 1101 of FIG. 11 has frequency components which are specific to the main scanning direction and the sub scanning direction shown in FIG. 11. Here, the first frequency component extracting section 606 extracts a spatial frequency component in which a white pixel of the key image information 1101 is a plus (+) amplitude, and a black pixel thereof is a minus (−) amplitude. Therefore, the first frequency component extracting section 606 can extract a frequency component 1104 of a sine wave which has one cycle in 8 pixels in the main scanning direction of the key information 1101 of FIG. 11. Also, the first frequency component extracting section 606 can extract a frequency component 1105 of a sine wave which has two cycles in 8 pixels in the sub scanning direction of the key information 1101 of FIG. 11.

FIG. 12 is a view illustrating a processing operation of the zero cross point extracting section 607.

The zero cross point extracting section 607 extracts a point which changes from a plus (+) to a minus (−) in the frequency component extracted by the first frequency component extracting section 606 as a zero cross point. The zero cross point extracting section 607 totalizes the number for projecting the coordinates of the extracted zero cross point. The zero cross point extracting section 607 extracts the coordinates at which there exists the number equal to or more than a threshold value for zero cross point extraction as a zero cross point of a reference phase.

In the example of FIG. 12, a zero cross point of the main scanning direction is extracted at plural locations of the sub scanning direction. The zero cross point extracting section 607 accumulates a coordinate value of the main scanning direction corresponding to the extracted zero cross point. In the example of FIG. 12, the zero cross point extracting section 607 obtains a frequency distribution of FIG. 12 as a frequency distribution of the zero cross point of the main scanning direction. When the frequency distribution of the zero cross point is obtained, the zero cross point extracting section 607 extracts the coordinate value whose frequency is equal to or more than a threshold value (TH) for zero cross point extraction as a zero cross point of a reference phase.

FIG. 13 is a view illustrating a processing operation of the deviation amount processing section 608.

The deviation amount processing section 608 computes an amplitude of a spatial component, a differential value of an amplitude, and the deviation amount of them in each coordinate which is the zero cross point of the reference phase extracted by the zero cross point extracting section 607. The deviation amount processing section 608 substitutes a pixel value according to the computed deviation amount. For example, FIG. 13 shows image information composed of pixel values substituted according to the computed deviation amount. In the example of FIG. 13, the deviation amount processing section 608 substitutes a black for pixel values of the coordinates which deviate by a threshold value for deviation judgment or more and a white for pixel values of the coordinates which have the deviation amount of less than a threshold value for deviation judgment.

By respective processing described above, the first reconstructing section 614 creates the reconstruction image of the first sub information 102 as the first reconstruction image information.

Next, processing operations of the respective components of the second reconstructing section 615 will be described.

First, the smoothing processing section 610 will be described.

FIG. 14A to 14C are views illustrating a processing operation of the smoothing processing section 610.

FIG. 14A is a view illustrating an example of a signal extracted by the second frequency component extracting section 609. The second frequency component extracting section 609 extracts a spatial frequency component in which a white pixel is a plus (+) amplitude and a black pixel is a minus (−) amplitude. In the example of FIG. 14A, a transverse axis denotes a location (x direction or y direction), and a vertical axis denotes an amplitude (signal intensity).

Also, in FIG. 14A, for easy understanding, a relationship between an amplitude and a location of the frequency component is represented by a two-dimensional graph. However, in case of representing a relationship between an amplitude and a location of a frequency component of a two-dimensional image, to be exact, a three-dimensional graph other than the two-dimensional graph of FIG. 14A is used.

In FIG. 14A, there are a wave with a relatively large amplitude and a wave with a relatively small amplitude. The wave with a relatively large amplitude is a section from which the electronic watermarking is extracted. Such an area is indicated by "signal exists" in the drawing. The wave with a relatively small amplitude is a section from which the electronic watermarking is not extracted. Such an area is indicated by "no signal" in the drawing.

FIGS. 14B and 14C are views illustrating examples of waveforms transformed from the waveforms of FIG. 14A. FIG. 14B shows a waveform of when constant-multiple processing for that of FIG. 14A is performed by using an absolute value. That is, it is difficult to determine whether a signal representing the presence or absence of the electronic watermarking exists or not by the waveform of FIG. 14A itself. Therefore, when the waveform of FIG. 14A is transformed like FIGS. 14B and 14C, an area where the electronic watermarking exists and an area where the electronic watermarking does not exist are apparently separated. Processing for transforming the waveform of FIG. 14A to the waveform of FIG. 14C is referred to as smoothing processing.

Next, the normalization processing section 611 will be described.

FIGS. 15A and 15B are views illustrating a normalization processing operation of the normalization processing section 611.

FIG. 15A is a view illustrating a waveform obtained as the processing result of the smoothing processing section 610.

In the waveform of FIG. 15A, two kinds of waveforms are mixed: a waveform with a relatively large peak A2; and a wave with a relatively small peak A1 are mixed. As described above, the waveform with a small peak A1 represents an area having no electronic watermarking. That is, the waveform with a small peak A1 is information which is not used to detect sub information.

The normalization processing section 611 performs normalization processing as processing for converting the waveform obtained by the smoothing processing section 610 to information representing the detecting result of the sub information. For example, in normalization processing, coordinate conversion in which only a section whose amplitude is equal to or greater than the pitch A1 is recognized as the detection result of the sub information is performed for the waveform of FIG. 15A.

FIG. 15B is a view illustrating an example of a result (waveform) that the coordinate conversion is performed as normalization processing for the waveform of FIG. 15A. Here, 8 bits are allocated to each color plane. In this instance, in normalization processing, performed is the coordinate conversion in which a minimum value of the waveform of equal to or greater than the peak A1 shown in FIG. 15A becomes "0" and a maximum value thereof becomes "255". As a result, the waveform of FIG. 15A is converted into the waveform of FIG. 15B. That is, the waveform of FIG. 15B becomes a waveform in which an area where the electronic watermarking exists is highlighted. In FIG. 15B, for easy understanding, a signal with an amplitude of equal to or less than "0" is described. Actually, however, a signal with an amplitude of equal to or less than "0", i.e., a signal (waveform), which is equal to or less than the peak A1, obtained by smoothing processing is cut off, and the remaining signal is converted to be included in a range of "0" to "255".

By the above-described processing, the second reconstructing section 615 creates the reconstruction image of the second sub information as the second reconstruction image information.

Next, the recognizing section 616 will be described.

The recognizing section 616 performs recognition processing (decoding processing) for the second sub information 103 as the second reconstruction image information obtained from the normalization processing section 611 of the second reconstructing section 615. In the first embodiment of the present invention, the image information in which the second sub information is encoded by a two-dimensional code is embedded in the main image information 101. Therefore, the second reconstructing section 615 reconstructs the image information in which the second sub information is encoded by a two-dimensional code as the second reconstruction image information. The image information which is a two-dimensional code is not information which can be understood directly by a human being. For this reason, the recognizing section 616 performs processing (decoding processing for two-dimensional code) for recognizing information from the second reconstruction image information reconstructed by the second reconstructing section 615. The recognizing section 616 outputs the recognition processing result of the second reconstruction image information to the result selecting section 612. The recognizing section 616 may determine whether information which is like the second sub information is recognized from the second reconstruction image information or not. In this instance, the recognizing section 161 outputs the determination result (information representing whether recognition is successful or fails).

Next, the result selecting section 612 will be described.

Figure 16:
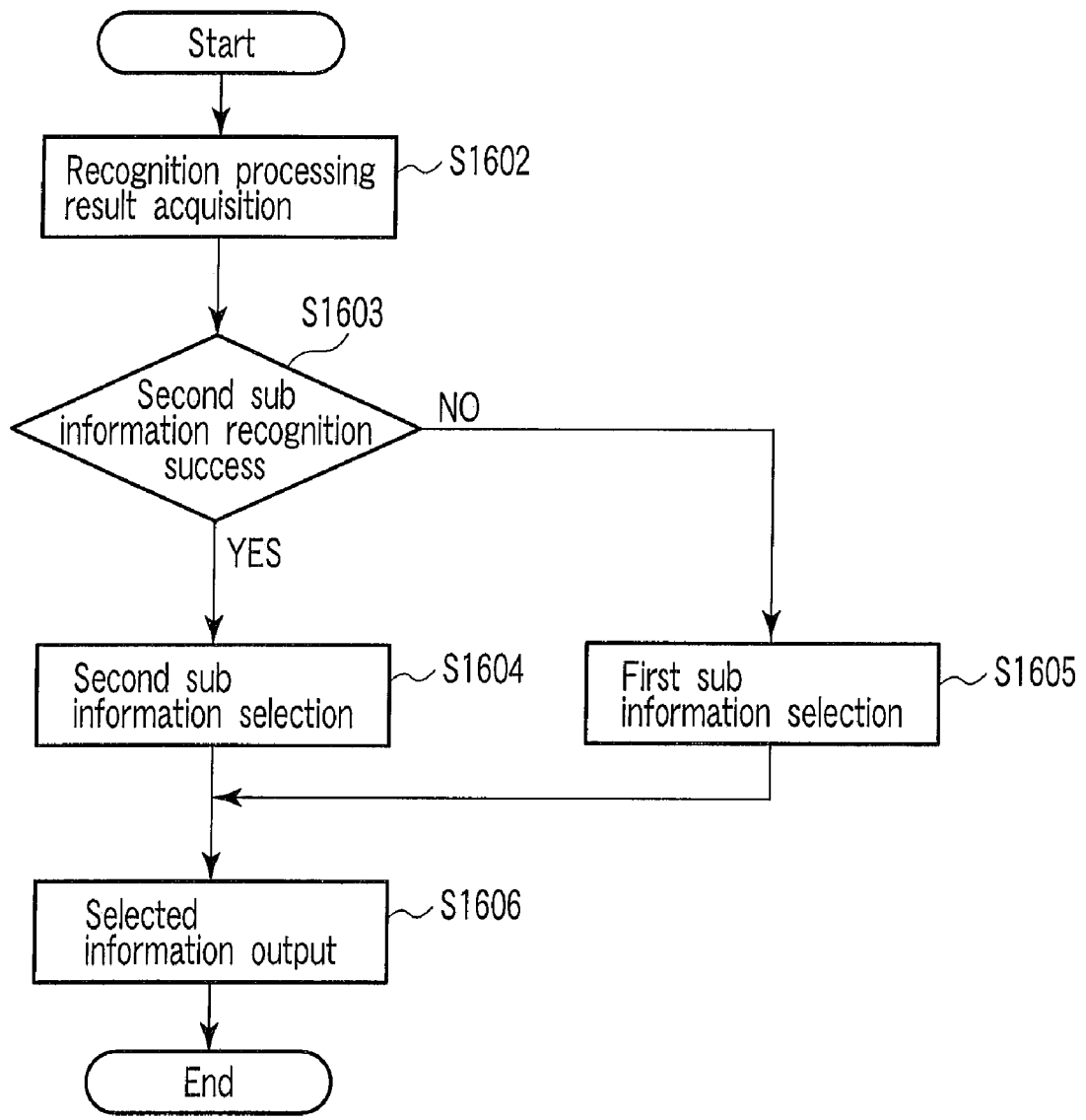
FIG. 16 is a flowchart illustrating a processing flow of a result selecting section.

FIG. 16 is a flowchart illustrating a processing flow of the result selecting section 612.

First, the result selecting section 612 acquires the recognition result of the second reconstruction image information from the recognizing section 616 (step S1602). Here, the recognizing section 616 may provide the result selecting section 612 only with information obtained by recognition processing of the second reconstruction image information or may provide the result selecting section 612 with information representing whether information which is like the second sub information 103 is obtained as the recognizing result or not. In case of the former, the result selecting section 612 determines whether the recognition result by the recognizing section 616 is information which is like the second sub information 103 or not (recognition successful or not).

If it is determined that recognition processing by the recognizing section 616 is successful (step S1603, YES), the result selecting section 612 selects the second sub information 103 as the reconstruction processing result of the electronic watermarking information (step S1604). In this instance, information selected as the reconstruction processing result is the second sub information (e.g., text information) obtained by decoding the two-dimensional code as the second reconstruction image information.

If it is determined that the recognition processing by the recognizing section 616 fails (step S1603, NO), the result selecting section 612 selects the first sub information 102 as the reconstruction processing result of the electronic watermarking information (step S1605). In this instance, information selected as the reconstruction processing result is the image information itself obtained as the first reconstruction image information. That is, the first reconstruction image information is the first sub information expressed as the image information.

When the first sub information 102 is selected as the reconstruction processing result of the electronic watermarking information, the result selecting section 612 outputs the first reconstruction image information as the image information representing the first sub information, and outputs the second sub information as a result of decoding the second reconstruction image information as a two-dimensional code (step S1606).

As described above, the result selecting section 612 gives priority to the information reconstructed as the second sub information 103 so that it can be first outputted, based on the recognizing result by the recognizing section 616. This is because the second sub information 103 is information of a high use value which is readable by a machine like a two-dimensional code. For example, in an access control system for managing the entrance and exit of a person, the entrance and exist are managed based on the second sub information 103 decoded by the reconstruction processing. Therefore, the result selecting section 612 first outputs the second sub information 103 obtained by recognition processing by the recognizing section 616 if recognition of the second sub information 103 is successful.

However, if recognition of the second sub information 103 fails, the second reconstruction image information becomes meaningless. This is because the image information reconstructed as the second reconstruction image information is image information which is obtained by two-dimensionally encoding the second sub information 103 and thus can not be understood by a human being. For this reason, if recognition of the second sub information 103 fails, the result selecting section 612 outputs the first sub information which can be understood directly by a human being as the first reconstruction image information. In this instance, in the access control system for managing the entrance and exit of a person, the first reconstruction image information as the reconstructing result of the first sub information 102 is displayed on the display device. Therefore, even though the second sub information 103 which is machine-readable is not reconstructed, human-based processing using the first sub information 102 displayed on the display device can be performed.

Next, a modification of the second reconstructing section will be described.

Figure 17:
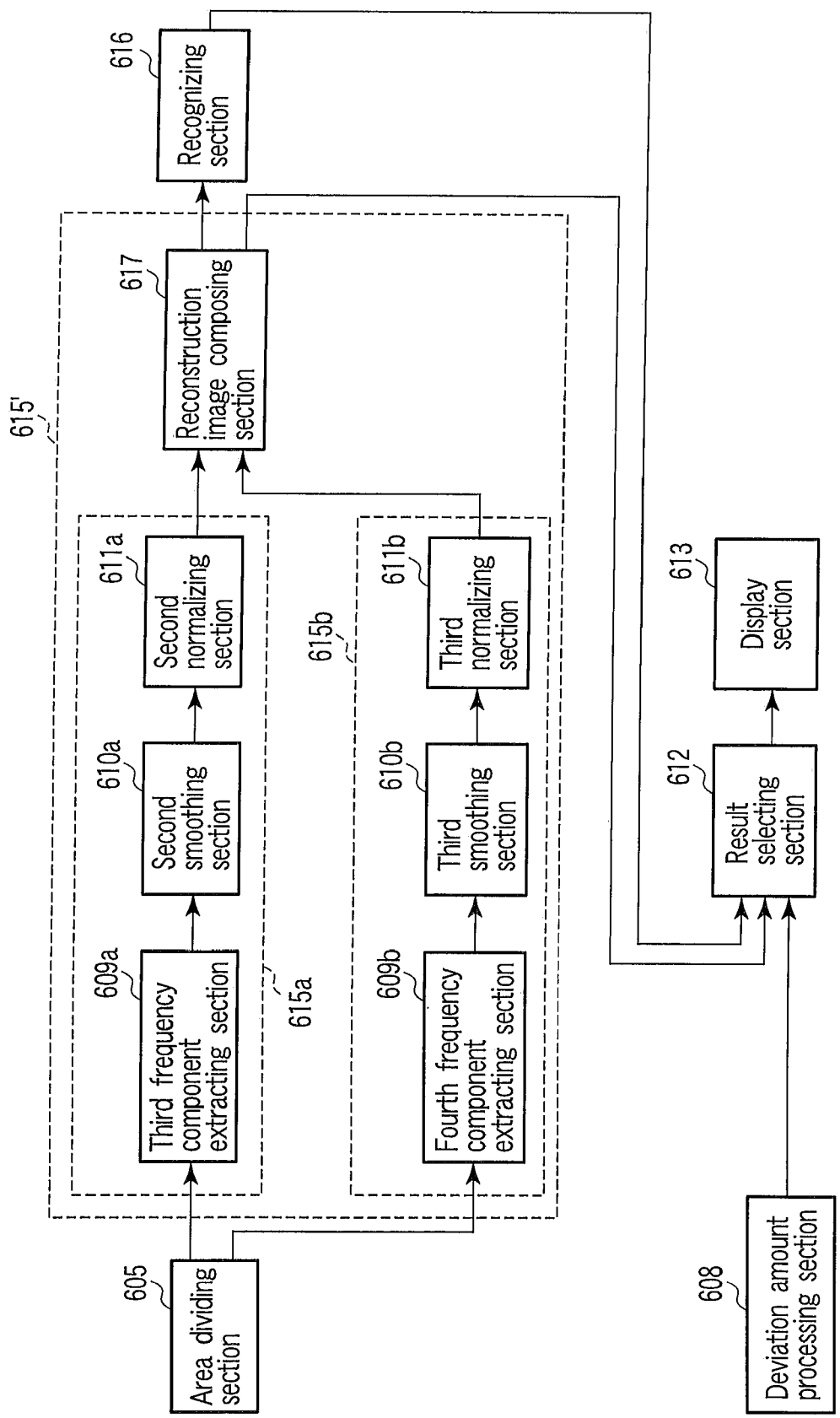
FIG. 17 is a block diagram illustrating a modification of a second reconstructing section.

FIG. 17 is a block diagram illustrating a second reconstructing section 615' as a modification of the second reconstructing section 615.

The second reconstructing section 615 of FIG. 6 includes three processing sections: the second frequency component extracting section 609; the smoothing processing section 610; and the normalization processing section 611. The second reconstructing section 615' of FIG. 17 includes a third reconstruction processing section 615a and a fourth reconstruction processing section 615b which are provided in parallel. The second reconstructing section 615' of FIG. 17 further includes a reconstruction image composing section 617 which composes a processing result of the third reconstruction processing section 615a and a processing result of the fourth reconstruction processing section 615b.

The third reconstruction processing section 615a includes a third frequency component extracting section 609a, a second smoothing processing section 610a, and a second normalization processing section 611a as shown in FIG. 17. The fourth reconstruction processing section 615b includes a fourth frequency component extracting section 609b, a third smoothing processing section 610b, and a third normalization processing section 611b as shown in FIG. 17.

The third reconstruction processing section 615a performs reconstruction processing by using the second key information 105. The third reconstruction processing section 615a creates third reconstruction image information as the reconstruction processing result using the second key information 105. The fourth reconstruction processing section 615b performs reconstruction processing by using the third key information 106. The fourth reconstruction processing section 615b creates fourth reconstruction image information as the reconstruction processing result using the third key information 106.

The reconstruction image composing section 617 composes the third reconstruction image information obtained from the third reconstruction processing section 615a and the fourth reconstruction image information obtained from the fourth reconstruction processing section 615b to create the second reconstruction image information. The reconstruction image composing section 617 provides the second reconstruction image information to the recognizing section 616 and the result selecting section 612.

The reconstruction image composing section 617 has a function of emphasizing an image component in which the third reconstruction image information and the fourth reconstruction image information coincide with each other or of weakening an image component in which the third reconstruction image information and the fourth reconstruction image information do not coincide with each other. For example, the reconstruction image composing section 617 may create the second reconstruction image information by a logical product of the two image information. In this case, the reconstruction image composing section 617 can increase a reconstruction rate of the second reconstruction image information. By using a logical sum of the third reconstruction image information and the fourth reconstruction image information, a section that is not perfect in respective reconstruction processing (reconstruction processing in the third reconstruction processing section 615a or reconstruction processing in the fourth reconstruction processing section 615b) can be complemented.

As another method for reconstructing the first sub information 102, a method for using a reconstruction mask sheet may be used. The reconstruction mask sheet is a sheet which makes the first sub information 102 of the composite image information 123 recorded on the recording material 125 visible by the human naked eye. The reconstruction mask sheet is created by recording image information, which uses a black pixel of the key information used in a bit plane of the sub information to be reconstructed as recording information and a white pixel as non-recording information, on a transparent recording medium at the same recording resolution as the recording resolution of the composite image information 123 of the recording section 124. The reconstruction mask sheet physically overlaps the recording material 125 on which the composite image information 123 is recorded. As a result, in the composite image information 123 recorded on the recording material 125, the first sub information 102 which is the electronic watermarking becomes a visible state (is reconstructed).

Such a reconstruction processing method pays attention to the fact that the first key image information is converted to the color difference amount of the complementary color combination to become seeming achromatic information by color difference modulation processing. In the reconstruction mask sheet, a black pixel is recorded at a location corresponding to a pixel of a first color in the composite image information, and a location corresponding to a pixel of a second color is a non-recording state. For this reason, when the reconstruction mask sheet exactly overlaps the composite image information 123, a black pixel corresponding to a first color is blocked by a black, and a non-recording pixel corresponding to a second color becomes transparent and thus transmitted. That is, when the reconstruction mask sheet exactly overlaps the composite image information 123, one of the first color and the second color which have a complementary color relationship is seen, and the other is blocked and thus invisible. In this state, a color balance of a color difference is broken, so that a section where the sub information is embedded is not recognized as an achromatic color and becomes visible.

In the first embodiment of the present invention, the first key information 104 is used corresponding to the first sub information 102, and the second key information 105 and the third key information 106 are used corresponding to the second sub information 103. However, the first key information 104 and the second key information 105 may be commonized. Also, as described above, in case of using three kinds of key information, the first sub information 102 and the second sub information 103 can be reconstruction-processed individually. However, when the first key information 104 and the second key information 105 are commonized, two kinds of sub information may be associated with each other. For this reason, a part of reconstruction processing of the first sub information 102 and a part of reconstruction processing of the second sub information 103 can be commonized.

As described above, the electronic watermarking embedding-processing section 10 according to the first embodiment of the present invention embeds the first sub information (e.g., a logo mark, a character, a diagram, etc.) which can be understood directly by a human being and the second sub information (e.g., machine-readable information like two-dimensional code) which is different from the first sub information 102 and so can not be understood directly by a human being into the main image information 101 based on the layout information 108 so that the two kinds of information do not interfere with each other. The electronic watermarking reconstruction processing section 20 according to the first embodiment of the present invention specifies an area for embedding the first sub information 102 and an area for embedding the second sub information 103 in the composite image information 123 based on the layout information and reconstructs the first sub information 102 and the second sub information 103.

Next, a second embodiment of the present invention will be described.

Figure 18:
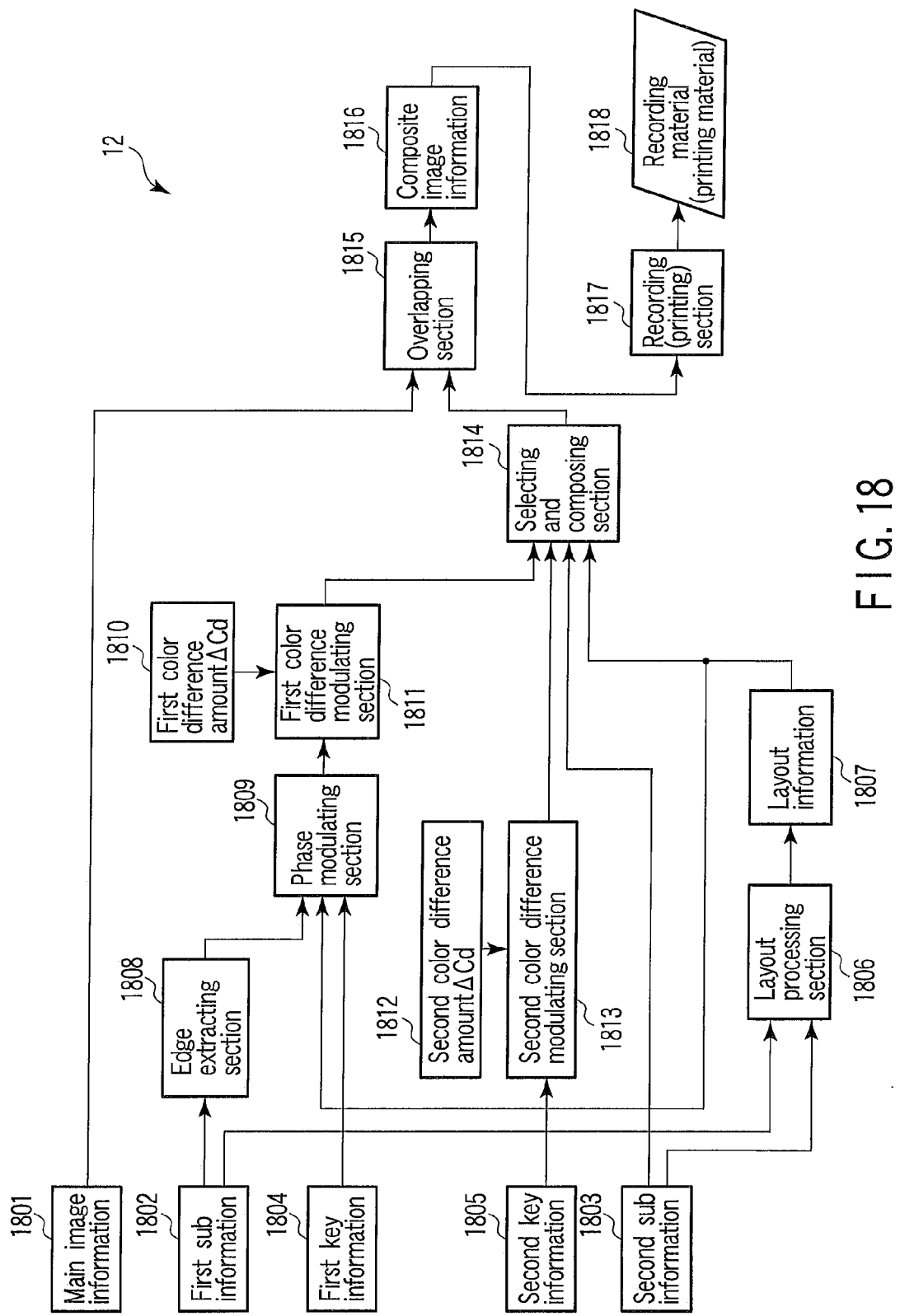
FIG. 18 is a schematic view illustrating an electronic watermarking embedding-processing section as an image processing device according to a second embodiment of the present invention.

FIG. 18 is a schematic view illustrating an electronic watermarking embedding-processing section 12 as an image processing device according to the second embodiment of the present invention.

The electronic watermarking embedding-processing section 12 includes a layout processing section 1806, an edge extraction processing section 1808, a phase modulating section 1809, a first color difference modulating section 1811, a second color difference modulating section 1813, a selecting and composing section 1814, an overlapping section 1815, and a recording section 1817. The electronic watermarking embedding-processing section 12 performs electronic watermarking embedding processing for embedding the sub information (e.g., security information), in an invisible state, into the main image information which is visible by a human naked eye, to create composite image information.

The layout processing section 1806 creates layout information 1807 in which first sub information 1802 and second sub information 1803 which are embedded in main image information 1801 do not interfere with each other. The first sub information 1802 is information which can be understood directly by a human being. The second sub information 1803 is information which can not be understood directly by a human being. Information such as the main image information 1801, the first sub information 1802, the second sub information 1803, and the layout information 1807 may be the same as the main image information 101, the first sub information 102, the second sub information 103, and the layout information 108 which are described in the first embodiment of the present invention.

The edge extraction processing section 1808 performs edge extraction for the first sub information 1802 as two-value image information. The phase modulating section 1809 performs phase modulation processing for the first key information 1804 based on the layout information 1807 and the first sub information 1802. The first color difference modulating section 1811 performs color difference modulation processing for the first key information 1804 which has been phase-modulated by the phase modulating section 1809 by using the predetermined first color difference amount 1810. The second color difference modulating section 1813 performs color difference modulation processing for the second key information 1805 as the two-value image information by using the predetermined second color difference amount 1812.

The selecting and composing section 1814 selects the second key information 1805 which is color difference-modulated by the second color difference modulating section 1813, based on the second sub information 1803. The selecting and composing section 1814 also composes the first key information 1804 which is color difference-modulated by the first color difference modulating section 1811 and the second key information 1805 which is color difference-modulated by the second color difference modulating section 1813 as the selecting result based on the second sub information 1803, based on the layout information 1807. Information composed by the selecting and composing section 1814 is composite information of the first sub information 1802 and the second sub information 1803 which are embedded in the main image information 1801. That is, the selecting and composing section 1814 performs processing for creating information which is to overlap the main image information 1801.

The overlapping section 1815 performs overlapping processing for the processing result of the selecting and composing section 1814 and the main image information 1801. That is, the overlapping section 1815 creates composite image information 1816 in which the first sub information 1802 and the second sub information 1803 are invisibly embedded in the main image information 1801. The recording section 1817 records (prints) the composite image information 1816 created by the overlapping section 1815 on a recording medium. Accordingly, the recording section 1817 creates a recording material 1818.

Next, a flow of electronic watermarking embedding processing according to the second embodiment of the present invention will be described.

Figure 19:
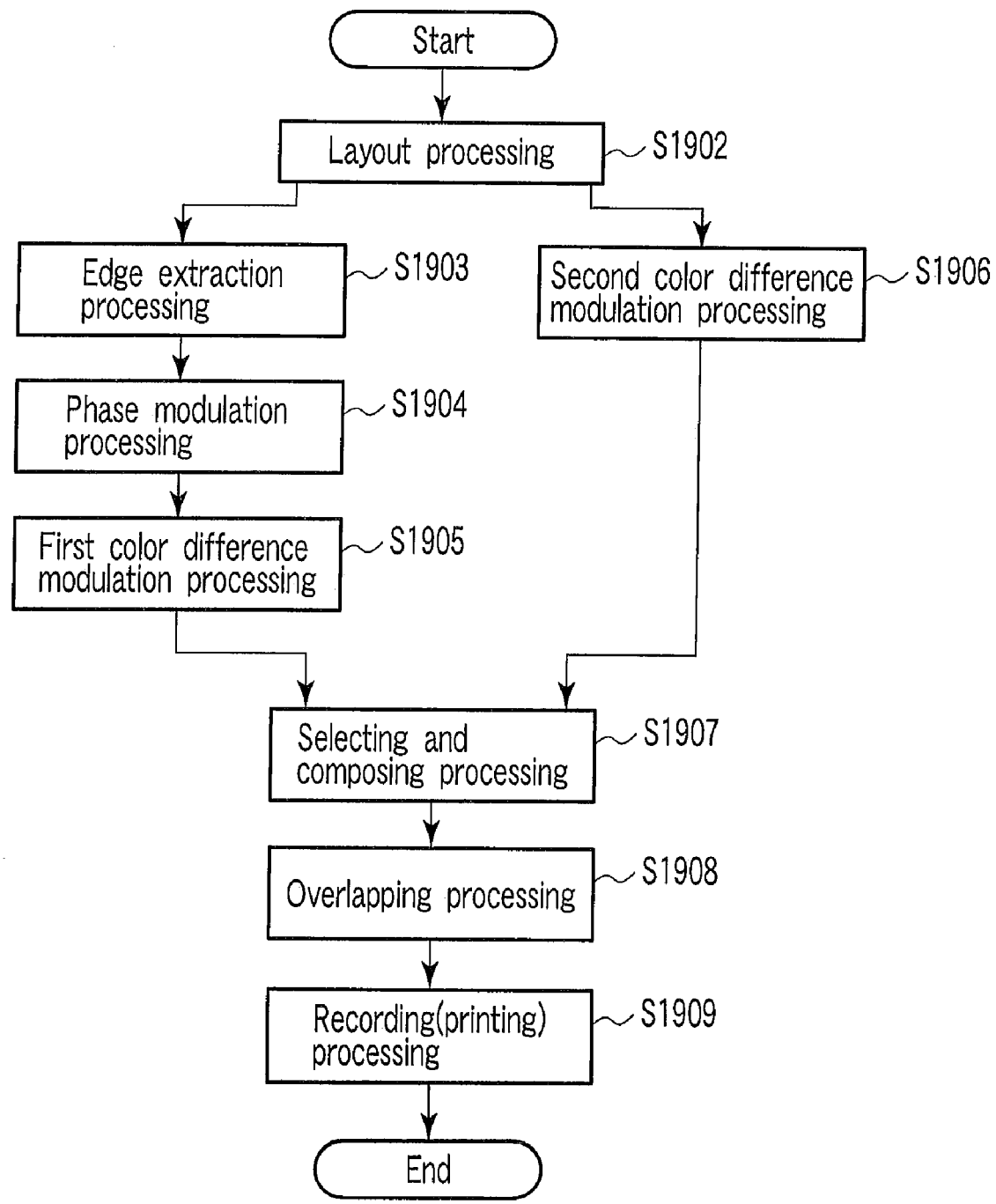
FIG. 19 is a flowchart illustrating schematically a flow of electronic watermarking embedding processing according to the second embodiment of the present invention.

FIG. 19 is a flowchart illustrating schematically a flow of electronic watermarking embedding processing according to the second embodiment of the present invention.

First, the layout processing section 1806 creates the layout information 1807 which specifies areas for embedding the first sub information 1802 and the second sub information 1803 in the main image information 1801 (step S1902).

The edge extraction processing section 1808 performs edge extraction processing for the first sub information 1802 as the two-value image information (step S1903). The phase modulating section 1809 performs phase modulation based on the processing result of the edge extraction processing section 1808 and the layout information 1807 (step S1904). The first color difference modulating section 1811 performs color difference modulation processing for the processing result of the phase modulating section 1809 based on the predetermined first color difference amount (ΔCd) 1810. Accordingly, the first color difference modulating section 1811 creates first color difference modulated image information (step S1905).

The second color difference modulating section 1813 performs color difference modulation processing for the second key information 1805 as the two-value image information based on the predetermined second color difference amount (ΔCd) 1812. Accordingly, the second color difference modulating section 1813 creates second color difference modulated image information (step S1906).

The selecting and composing section 1814 selects the processing result (second color difference modulated image information) of the second color difference modulating section 1813 based on the second sub information 1803. The selecting and composing section 1814 performs processing for composing the processing result (first color difference modulated image information) of the first color difference modulating section 1811 and the second color difference modulated image information selected based on the second sub information 1803, based on the layout information 1807 (step S1907).

The overlapping section 1815 overlaps the main image information 1801 and the processing result of the selecting and composing section 1814. Accordingly, the overlapping section 1815 creates the composite image information 1816 (step S1908).

The recording section 1817 records (prints) the composite image information 1816 created by the overlapping section 1815 on a recording medium. Accordingly, the recording section 1817 creates the recording material 1818 such as an ID card in which the main image information 1801 for embedding the first and second sub information in an invisible state therein is printed in a visible state (step S1909).

Figure 20:
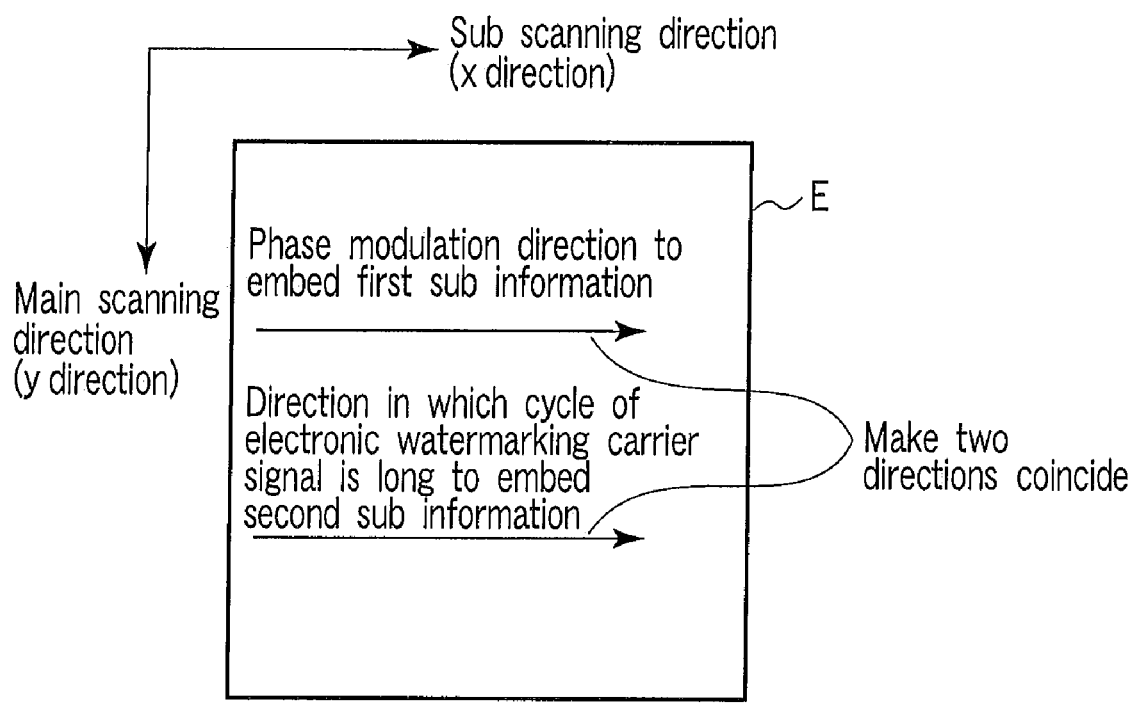
FIG. 20 is a view illustrating an embedding direction of electronic watermarking information.

FIG. 20 is a view illustrating an embedding direction of the electronic watermarking information.

In the electronic watermarking embedding-processing section 12 according to the second embodiment of the present invention, the first sub information 1802 and the second sub information 1803 are embedded in the main image information 1801. In the electronic watermarking embedding-processing section 12, an embedding direction of the first sub information 1802 and an embedding direction of the second sub information 1803 with respect to the main image information 1801 have a predetermined relationship.

In FIG. 20, an area E is an image area with the same size as the main image information 1801. As shown in FIG. 20, if a transverse direction denotes a sub scanning direction (x direction), and a vertical direction denotes a main scanning direction (y direction), the first sub information 1802 and the second sub information 1803 are embedded in the main image information 1801 to coincide with a direction of (1) and a direction of (2) which are described below.

(1) A phase modulation direction of the electronic watermarking to embed the first sub information.

(2) A direction in which a cycle of an electronic watermarking carrier signal to embed the second sub information is long.

The phase modulating section 1809 performs phase modulation processing according to Equations (B-1) to (B-3) described in the first embodiment of the present invention. That is, as phase modulation processing, the phase modulating section 1809 performs processing for displacing pixel information in a certain direction. The phase modulating section 1809 replaces a location of pixel information in a certain direction and so needs the predetermined width in that direction.

A carrier signal of the electronic watermarking can be expressed by a combination of a sine function and a cosine function. If the brightness of a pixel of an image is recognized as the amplitude, the distribution of a brightness value in a two-dimensional image can be expressed by a combination of a sine function and a cosine function. Here, the brightness distribution of the second key information as the two-value image information can be recognized as a carrier signal of the electronic watermarking.

The second key information is embedded as two-dimensional image information. For this reason, the carrier signal can be decomposed into an x direction and a y direction. Of the carrier signal decomposed into the x direction and the y direction, one with a longer cycle is set to coincide with the direction of (1). Therefore, within the cycle of the carrier signal, phase modulation processing of (1) is performed. Therefore, a periodicity of an image does not collapse.

To the contrary, if of the carrier signal decomposed into the x direction and the y direction, one with a shorter cycle coincides with the direction of (1), phase modulation processing of (1) may not be accepted within the cycle of the carrier signal of (2). In this instance, there is a possibility that the periodicity of an image collapses. If the periodicity of an image collapses, it may not function as the electronic watermarking.

In the example of FIG. 20, the direction of (1) and the direction of (2) coincide with the sub scanning direction. As shown in FIG. 18, the composite image information 1816 is recorded (printed) on the recording medium by the recording section 1817 such as a color printer. As a result, the recording material 1818 such as an ID card is created. Generally, in a recording device like a printer, the sub scanning direction is lower in location control precision than the main scanning direction. As described above, phase modulation processing is processing for displacing a location of pixel information. Thus, with respect to a direction which is different by 90° and is not subject to phase modulation processing, location control precision is not very strict. If the first sub information is reconstructed by using the reconstruction mask sheet, influence of location control precision in print processing for the composite image information 1816 is large.

As reconstruction processing for the first sub information 1802 and the second sub information 1803, reconstruction processing for the electronic watermarking information described in the first embodiment of the present invention may be applied.

As described above, in the electronic watermarking embedding-processing section 12 according to the second embodiment of the present invention, created is the composite image information 1816 in which the first sub information 1802 and the second sub information 1803 which is different from the first sub information 1802 and can not be understood directly by a human being are embedded in the main image information 1801 based on the layout information 1807 so as not to interfere with each other.

Next, a third embodiment of the present invention will be described.

FIG. 21 is a view illustrating schematically an electronic watermarking embedding-processing section 14 as an image processing device according to the third embodiment of the present invention.

The electronic watermarking embedding-processing section 14 according to the third embodiment of the present invention and the electronic watermarking embedding-processing section 10 according to the first embodiment of the present invention are different in the fact that a layout processing section 2107 is different from the layout processing section 107.

That is, the electronic watermarking embedding-processing section 14 of FIG. 21 creates the layout information 108 by using the main image information 101, the first sub information 102 and the second sub information 103.

In the electronic watermarking embedding-processing section 14 of FIG. 21, other components than the layout processing section 2107 may be realized by the same components of the electronic watermarking embedding-processing section 10 of FIG. 1. Therefore, detailed descriptions on other components than the layout processing section 2107 are omitted.

Next, an operation of the layout processing section 2107 will be described.

Figure 22:
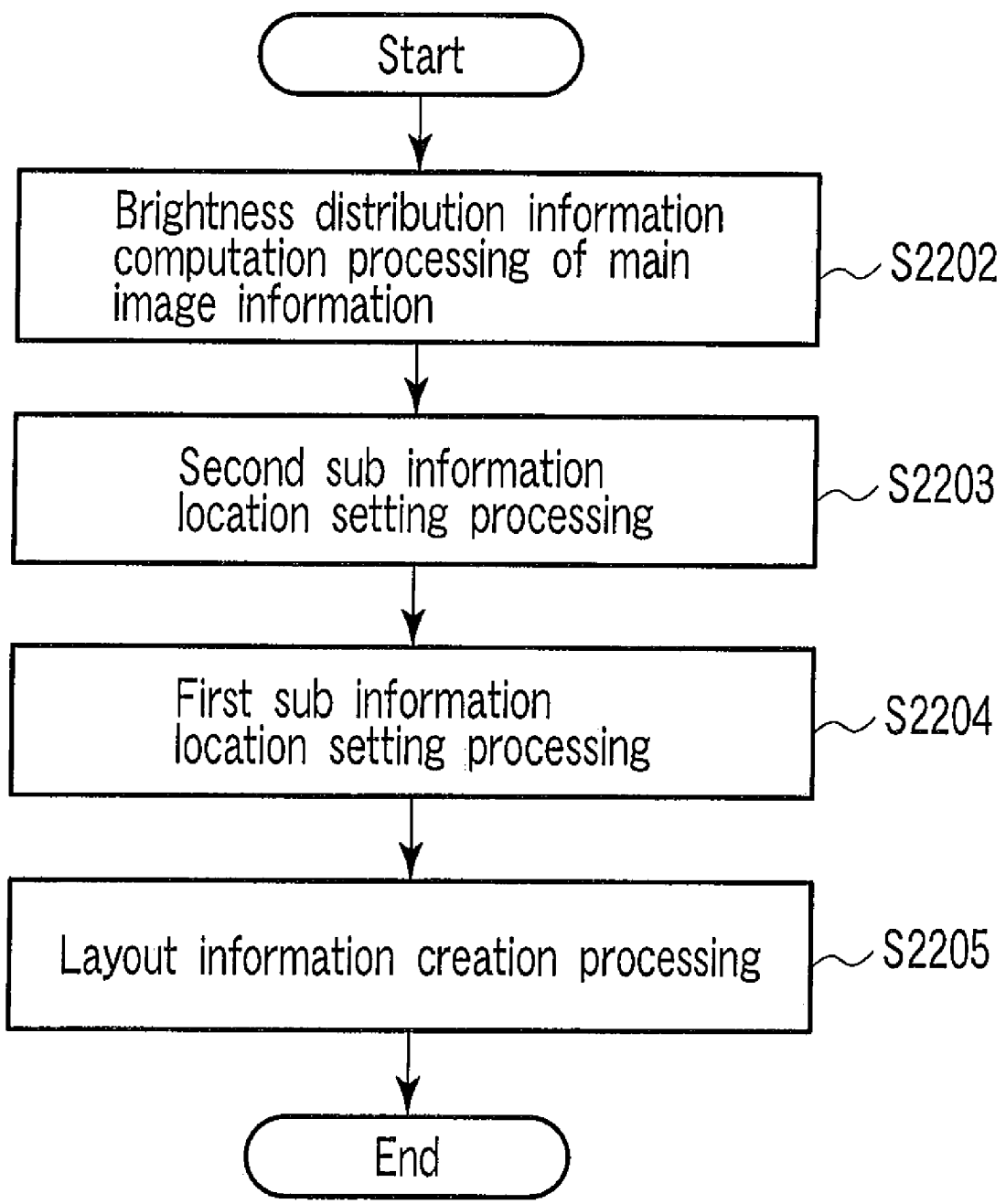
FIG. 22 is a flowchart illustrating an exemplary operation of a layout processing section.

FIG. 22 is a flowchart illustrating an exemplary operation of the layout processing section 2107.

The layout processing section 2107 computes brightness distribution information of the main image information 101 (step S2202). For example, the layout processing section 2107 v-divides (v: positive integer) the main image information 101 in a transverse direction (x direction) and w-divides (w: positive integer) the main image information 101 in a vertical direction (y direction). The layout processing section 2107 computes an average brightness value L (u, v) in a unit of a divided small area. The layout processing section 2107 computes brightness distribution of the whole main image information 101 based on the average brightness value L (u, v) of each small area which constitutes the main image information 101.

As a method for computing the average brightness value L (u, v) of each small area which constitutes the main image information 101, various techniques can be applied. For example, the average brightness value L (u, v) of each small area can be approximated by simply computing an average value of R, G and B of an attention pixel (i, j). Here, the layout processing section 2107 computes it according to Equation (G-1):

$$L(u, v) = \alpha \times R(u, v) + \beta \times G(u, v) + \gamma \times B(u, v) \quad (G-1)$$

Here, $\alpha+\beta+\gamma=1$ is assumed. For example, if $\alpha=0.299$ and $\beta=0.587$, $\gamma=0.114$.

When the brightness distribution information of the main image information 101 is computed, the layout processing section 2107 sets a location (second area) for embedding the second sub information 103 in the main image information 101 (step S2203). In the brightness distribution information (brightness of each small area) of the main image information 101, if a minimum value is $L(u, v)_{min}$ and a maximum value is $L(u, v)_{max}$, a center value $L(u, v)_{center}$ can be computed by Equation (G-2):

$$L(u, v)_{center} = (L(u, v)_{min} + L(u, v)_{max})/2 \quad (G-2)$$

In electronic watermarking embedding-processing according to the third embodiment of the present invention, color difference modulation is used. For this reason, there is a possibility that an area close to a minimum value or a maximum value of brightness does not sufficiently secure a color difference. Therefore, there is a possibility that sub information is not properly embedded in an area close to a minimum value or a maximum value of brightness. That is, in the main image information 101, an area for embedding the second sub information 103 is arranged in an area having a high distribution of values close to a center value of a brightness distribution. As a result, a color difference can be sufficiently secured when the second sub information 103 is embedded. Therefore, there is a high possibility that the second sub information 103 is surely embedded in the main image information 101.

The layout processing section 2107 sets a location (first area) for embedding the first sub information 102 in the main image information 101 based on the brightness distribution information of the main image information 101 (step S2204). The layout processing section 2107 sets the embedding location of the first sub information 102 in at least an area excluding the embedding location (second area) of the second sub information 103. The layout processing section 2107 selects an area in which a distribution of values close to a center value of a brightness distribution is high, among the areas excluding the second area.

In the third embodiment of the present invention, a priority is given to embedding the second sub information 103 rather than the first sub information 102. For this reason, setting of the second area (step S2203) is performed earlier than setting of the first area (step S2204). However, in an operation form which gives a priority to embedding the first sub information 102 rather than the second sub information 103, setting of the first area is performed earlier than setting of the second area.

When the embedding location (first area) of the first sub information 102 and the embedding location (second area) of the second sub information 103 are determined, the layout processing section 2107 creates the layout information 108 which specifies the first area and the second area in the main image information 101 (step S2205).

Next, examples of each information will be described below.

Figure 23A:
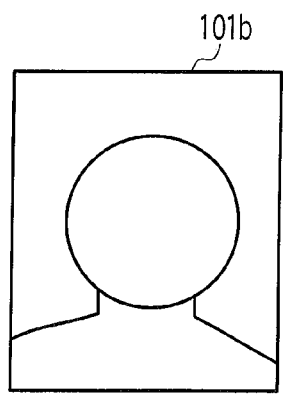
FIG. 23A is a view illustrating an example of the main image information.
Figure 23B:
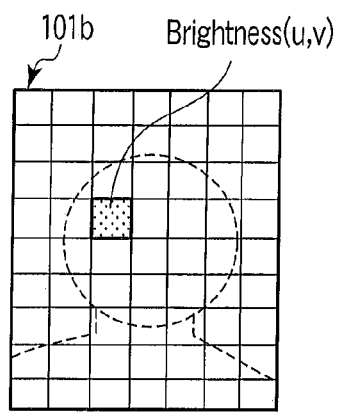
FIG. 23B is a view illustrating a state that the main image information of FIG. 23A is divided into small areas to obtain brightness distribution.
Figure 23C:
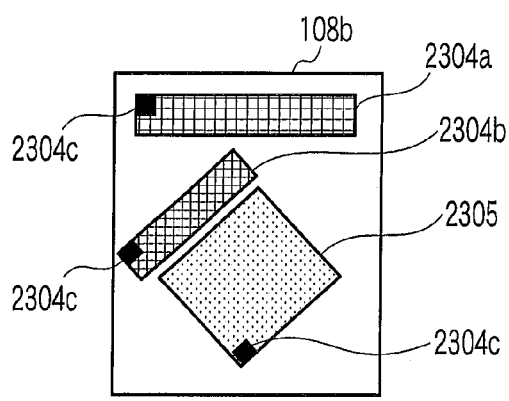
FIG. 23C is a view illustrating an example of the layout information.
Figure 23D:
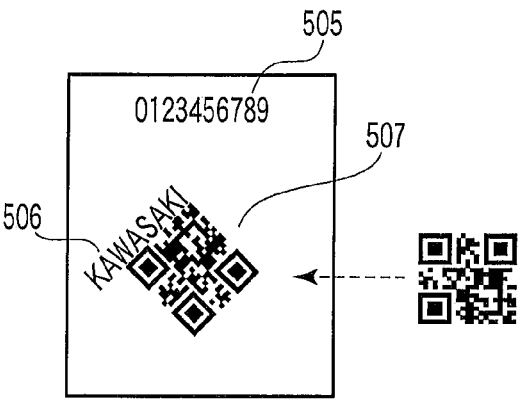
FIG. 23D is a view illustrating the first sub information and the second sub information layoutted in the main image information based on the layout information of FIG. 23C.

FIG. 23A is a view illustrating an example of the main image information 101b. FIG. 23B is a view illustrating a state that the main image information 101b of FIG. 23A is divided into small areas. FIG. 23C is a view illustrating an example of the layout information 108b. FIG. 23D is a view illustrating the first sub information 102 and the second sub information 103 layoutted in the main image information 101b based on the layout information 108b of FIG. 23C.

The main image information 101b of FIG. 23A is divided into small areas to obtain the brightness distribution as described above. For example, the layout processing section 2107 v-divides (v: positive integer) the main image information 101b of FIG. 23A in a transverse direction (x direction) and w-divides (w: positive integer) the main image information 101b in a vertical direction (x direction), whereby the main image information 101b is divided into small areas. FIG. 23B schematically shows a state that the main image information 101b of FIG. 23A is divided into small areas. Each lattice of FIG. 23B corresponds to each small area. When the main image information 101b of FIG. 23A is divided into small areas as shown in FIG. 23B, the layout processing section 2107 computes an average brightness value L (u, v) of each small area. A distribution of the average brightness value L (u, v) of each small area in the main image information 101b represents the brightness distribution of the whole main image information 101b.

The layout processing section 2107 determines an area (second area) suitable for embedding the second sub information 103 and an area (first area) suitable for embedding the first sub information 102 based on the brightness distribution of the whole main image information 101b. For example, the layout processing section 2107 first sets the second area based on the brightness distribution of the whole main image information 101b. The layout processing section 2107 sets the first area based on the brightness distribution of the whole main image information 101b and the second area. As a result, the layout processing section 2107 can layout the second sub information in an optimum area of the main image information, and can layout the first sub information in an area which does not interfere with the second sub information.

FIG. 23C shows the layout information 108b for layoutting the first sub information 102 and the second sub information 103 in the main image information 101b.

In the layout information 108b of FIG. 23C, the first sub information 102 is embedded in two areas, and the second sub information is embedded in a single area. In FIG. 23C, an area 2304a and an area 2304b represent an area (first area) for embedding the first sub information 102. The first sub information is composed of information divided into two. For example, the first sub information 102 embedded in the area 2304a is information of a digit string (e.g., digit string 505 of FIG. 5B). The first sub information 102 embedded in the area 2304a is information of a character string (e.g., character string 506 of FIG. 5B).

In FIG. 23C, an area 2305 represents an area (second area) for embedding the second sub information 103. The second sub information 103 embedded in the area 2305 is machine-readable image information (e.g., two-dimensional image information of FIG. 5B like a two-dimensional code) which can not be understood directly by a human being.

In FIG. 23C, locations which become a reference point in the area 2304a, the area 2304b and the area 2305 are indicated by a mark 2304c (black-color rectangular mark). The mark 2304c is necessary because it is assumed that the areas 2304a, 2304b and 2305 are layoutted in a rotated state.

For example, if the upper-left section of each area is considered as an initial reference point, a location of the mark 2304c changes corresponding to movement of each area in a rotation direction. That is, it is shown in FIG. 23C that the area 2304a does not rotate since the mark 2304c is in the upper-left section. It is shown in FIG. 23C that the area 2304b is rotated at an angle of 45° with respect to the transverse direction (x direction). It is also shown in FIG. 23C that the area 2305 is rotated at an angle of 135° with respect to the transverse direction (x direction).

FIG. 23D shows the first sub information 505 and 506 and the second sub information 507 which are layoutted based on the layout information 108*b* of FIG. 23C. As described above, each of the sub information 505, 506 and 507 is arranged in each area corresponding to the layout information. The layout information 108*b* of FIG. 23C also represents the rotation states of the areas 2304*a*, 2304*b* and 2305. Therefore, as shown in FIG. 23D, the sub information 506 and 507 are arranged in a rotated state. For example, as shown in FIG. 23D, the sub information 507 is arranged in a state which is left-rotated at an angle of 135°.

Next, a fourth embodiment of the present invention will be described.

FIG. 24 schematically shows a configuration of an electronic watermarking embedding-processing section 16 of an image processing device according to the fourth embodiment of the present invention.

FIG. 24 is a view illustrating schematically a configuration example of the electronic watermarking embedding-processing section 16 of the image processing device according to the fourth embodiment of the present invention.

The electronic watermarking embedding-processing section 16 according to the fourth embodiment of the present invention and the electronic watermarking embedding-processing section 12 of FIG. 18 according to the second embodiment of the present invention are different in the fact that a layout processing section 2107 is different from the layout processing section 107. That is, in the electronic watermarking embedding-processing section 16 of FIG. 24, the other components than the layout processing section 2107 may be realized with the same configuration as that of the electronic watermarking embedding-processing section 12 of FIG. 18 according to the second embodiment of the present invention.

In the electronic watermarking embedding-processing section 16 of FIG. 24, the layout processing section 2107 creates the layout information 108 by using the main image information 101, the first sub information 102 and the second sub information 103. The layout processing section 2107 of FIG. 24 may be realized by the same one as the layout processing section 2107 of FIG. 21 according to the third embodiment of the present invention.

Therefore, detailed descriptions on respective components of the electronic watermarking embedding-processing section 16 of FIG. 24 according the fourth embodiment of the present invention are omitted.

As described above, the present invention has the following advantages.

(1) It is possible to create the composite image information in which the first sub information (e.g., a logo mark, a character, a diagram, etc.) which can be understood directly by a human being and the second sub information (e.g., machine-readable information like a two-dimensional code) which is different from the first sub information and can not be understood directly by a human being are embedded in the main image information so as not to interfere with each other. Also, the first sub information and the second sub information can be reconstructed from the composite image information, respectively.

(2) If the second sub information as machine-readable information like a two-dimensional code is properly reconstructed, the second sub information is properly recognized by a machine. If the second sub information is properly recognized by a machine, various automation processing based on the second sub information can be performed.

(3) If reconstruction of the second sub information fails, in electronic watermarking reconstruction processing, the reconstruction result of the first sub information like a logo mark, a character, a diagram, etc. which can be understood directly by a human being is obtained as image information. In this instance, even though reconstruction processing fails, a system can be operated based on a judgment of a human being.

(4) Even through the second sub information is imperfectly reconstructed, if the first sub information and the second sub information are associated with each other, an imperfect reconstruction result can be interpolated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method for embedding sub information of an invisible state into main image information of a visible state, comprising:
    acquiring layout information which specifies an embedding location of first sub information and an embedding location of second sub information in the main image information;
    performing first image processing for invisibly embedding the first sub information in the main image information based on the layout information and predetermined first key information;
    performing second image processing for invisibly embedding the second sub information in the main image information based on the layout information and predetermined second key information and predetermined third key information, wherein the first, second, and third key information are different from each other; and
    performing image composite processing for composing a processing result of the first image processing and a processing result of the second image processing.

2. The image processing method according to claim 1, wherein the first image processing comprises:
    phase modulation processing for phase-modulating the first key information based on the layout information and the first sub information,
    first color difference modulation processing for color difference-modulating the phase-modulated first key information by using a first color difference amount, and
    first overlapping processing for overlapping the color difference-modulated first key information and the main image information, and
wherein the second image processing comprises:
    second color difference modulation processing for color difference-modulating the second key information by using a second color difference amount,
    third color difference modulation processing for color difference-modulating third key information by using a third color difference amount,
    selecting and composing processing for selecting one of the second color difference-modulated second key information and the third color difference-modulated third key information based on the second sub information and composing the color difference-modulated second key information and the color difference-modulated third key information which are selected based on the layout information, and second overlapping processing for overlapping a processing result of the selecting and composing processing with the main image information.

3. An image processing method for embedding sub information of an invisible state into main image information of a visible state, comprising:

acquiring layout information which specifies an embedding location of first sub information and an embedding location of second sub information in the main image information;

phase-modulating predetermined first key information based on the layout information and the first sub information;

performing first color difference modulation processing for color difference-modulating the phase-modulated first key information by using a first color difference amount;

performing second color difference modulation processing for color difference-modulating predetermined second key information by using a second color difference amount, wherein the first and second key information are different from each other;

selecting the second color difference-modulated second key information based on the second sub information; and composing the selected second color difference-modulated second key information and the first color difference-modulated first key information based on the layout information, and overlapping a processing result of the selecting and composing processing with the main image information.

4. The image processing method according to claim 3, wherein a direction of phase modulation to embed the first sub information coincides with a direction of a longest cycle among decomposed multi-direction cycles of a carrier signal to embed the second sub information.

5. The image processing method according to claim 1, wherein the layout information is created by determining an area for embedding the first sub information and an area for embedding the second sub information based on a brightness distribution of the main image information.

6. The image processing method according to claim 1, further comprising:

receiving image information recorded on a recording medium;

color-decomposing the received image information;

dividing image information of each color which is color-decomposed into a first area for embedding the first sub information and a second area for embedding the second sub information which are specified by the layout information;

creating a first reconstruction image from image information of each color corresponding to the first area; and creating a second reconstruction image from image information of each color corresponding to the second area.

7. The image processing method according to claim 6, further comprising:

performing information recognition processing for the second reconstruction image, wherein creating the second reconstruction image comprises outputting an information recognition result for the second reconstruction image as a reconstruction result if the recognition processing is successful and outputs the first reconstruction image as a reconstruction result if the recognition processing fails.

8. The image processing method according to claim 6, wherein creating the first reconstruction image comprises:

extracting a frequency component from image information of each color corresponding to the first area;

extracting a zero cross point from the extracted frequency component; and creating the first reconstruction image by a deviation amount from a reference phase of each coordinate of a spatial frequency component, based on the extracted zero cross point.

9. The image processing method according to claim 6, wherein creating the second reconstruction image comprises:

extracting a frequency component from image information of each color corresponding to the second area;

smoothing the extracted frequency component; and normalizing the smoothed information.

10. The image processing method according to claim 6, wherein creating the second reconstruction image comprises:

extracting a frequency component of second key information from image information of each color corresponding to the second area;

smoothing the extracted frequency component of the second key information;

normalizing the smoothed frequency component of the second key information;

extracting a frequency component of third key information from image information of each color corresponding to the second area;

smoothing the extracted frequency component of the third key information;

normalizing information representing the smoothed frequency component of the third key information; and composing information obtained by normalizing the frequency component of the second key information and information obtained by normalizing the frequency component of the third key information to create the second reconstruction image.

11. The image processing method according to claim 1, wherein the first sub information is image information which can be understood by a human being, and the second sub information is image information which is converted to recognizable information by predetermined recognition processing.

12. An image processing device for embedding sub information of an invisible state into main image information of a visible state, comprising:

an image processing section configured to embed first sub information in an embedding area of first sub information in the main image information and embed second sub information in an embedding area of the second sub information in the main image information, the embedding area of the first sub information and the embedding area of the second sub information being specified by layout information representing the embedding area of the first sub information and the embedding area of the second sub information in the main image information, image processing section comprising:

a first image processing section which embeds the first sub information in the main image information in an invisible state based on the layout information and predetermined first key information, a second image processing section which embeds the second sub information in the main image information in an invisible state based on the layout information and predetermined second key information and predetermined third key information, wherein the first, second, and third key information are different from each other, and
an image composing section which composes a processing result of the first image processing and a processing result of the second image processing.

13. The image processing device according to claim 12, wherein the first image processing section comprises:
a phase modulating section which phase-modulates the first key information based on the layout information and the first sub information,
a first color difference modulating section which color difference-modulates the phase-modulated first key information by using a first color difference amount, and
a first overlapping section which overlaps the color difference-modulated first key information and the main image information, and
wherein the second image processing section comprises:
a second color difference modulation processing section which color difference-modulates the second key information by using a second color difference amount,
a third color difference modulation processing section which color difference-modulates the third key information by using a third color difference amount,
a selecting and composing processing section which selects one of the second color difference-modulated second key information and the third color difference-modulated third key information based on the second sub information and composes the second color difference-modulated second key information and the third color difference-modulated third key information which are selected based on the layout information, and
a second overlapping section which overlaps a processing result of the selecting and composing processing section with the main image information.

14. An image processing device for embedding sub information of an invisible state into main image information of a visible state, comprising:
an image processing section configured to embed first sub information in an embedding area of first sub information in the main image information and embed second sub information in an embedding area of the second sub information in the main image information, the embedding area of the first sub information and the embedding area of the second sub information being specified by layout information representing the embedding area of the first sub information and the embedding area of the second sub information in the main image information, image processing section comprising:
a phase modulating section which phase-modulates predetermined first key information based on the layout information and the first sub information,
a first color difference modulating section which color difference-modulates the phase-modulated first key information by using a first color difference amount,
a second color difference modulating section which color difference-modulates predetermined second key information by using a second color difference amount, wherein the first and second key information are different from each other,
a selecting and composing section which selects the color difference-modulated second key information based on the second sub information and composes the selected color difference-modulated second key information and the modulation processed first key information based on the layout information, and
an overlapping section which overlaps a processing result of the selecting and composing section with the main image information.

15. The image processing device according to claim 14, wherein a direction of phase modulation to embed the first sub information coincides with a direction of a longest cycle among cycles of a carrier signal to embed the second sub information.

16. The image processing device according to claim 12, further comprising a layout processing section which determines an area for embedding the second sub information and an area for embedding the first sub information based on a brightness distribution of the main image information, and creates the layout information.

17. The image processing device according to claim 12, further comprising:
an input section which receives image information recorded on a recording medium;
a color decomposing section which color-decomposes the received image information;
a dividing section which divides image information of each color which is color-decomposed into a first area for embedding the first sub information and a second area for embedding the second sub information which are specified by the layout information;
first reconstructing section which creates first reconstruction image from image information of each color corresponding to the first area; and
a second reconstructing section which creates second reconstruction image from image information of each color corresponding to the second area.

18. The image processing device according to claim 17, further comprising a recognizing section which performs information recognition processing for the second reconstruction image,
wherein the second reconstructing section outputs an information recognition result for the second reconstruction image as a reconstruction result if the recognition processing is successful and outputs the first reconstruction image as a reconstruction result if the recognition processing fails.

19. The image processing method according to claim 3, wherein the layout information is created by determining an area for embedding the first sub information and an area for embedding the second sub information based on a brightness distribution of the main image information.

20. The image processing method according to claim 3, wherein the first sub information is image information which can be understood by a human being, and the second sub information is image information which is converted to recognizable information by predetermined recognition processing.

* * * * *